US008942666B2

(12) United States Patent
Petite

(10) Patent No.: US 8,942,666 B2
(45) Date of Patent: *Jan. 27, 2015

(54) SYSTEMS AND METHODS FOR PROVIDING EMERGENCY MESSAGES TO A MOBILE DEVICE

(71) Applicant: SIPCO, LLC, Atlanta, GA (US)

(72) Inventor: Thomas David Petite, Atlanta, GA (US)

(73) Assignee: SIPCO, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/943,598

(22) Filed: Jul. 16, 2013

(65) Prior Publication Data

US 2013/0303109 A1 Nov. 14, 2013

Related U.S. Application Data

(63) Continuation of application No. 13/102,849, filed on May 6, 2011, now Pat. No. 8,489,063, which is a continuation-in-part of application No. 12/356,358, filed on Jan. 20, 2009, now Pat. No. 8,666,357, which is a continuation of application No. 10/000,477, filed on Oct. 24, 2001, now Pat. No. 7,480,501.

(51) Int. Cl.

| *H04M 11/04* | (2006.01) |
| *H04W 4/22* | (2009.01) |
| *G01S 19/17* | (2010.01) |
| *H04W 4/12* | (2009.01) |
| *H04W 64/00* | (2009.01) |
| *H04W 76/00* | (2009.01) |

(52) U.S. Cl.
CPC .................. *H04W 4/22* (2013.01); *G01S 19/17* (2013.01); *H04M 11/04* (2013.01); *H04M 2242/30* (2013.01); *H04W 4/12* (2013.01); *H04W 64/00* (2013.01); *H04W 76/007* (2013.01)
USPC .................. 455/404.2; 455/404.1; 455/456.1; 379/45

(58) Field of Classification Search
CPC . H04M 2242/04; H04W 76/007; H04W 4/22; H04W 64/00
USPC .................... 455/404.2, 404.1, 456.1; 379/45
See application file for complete search history.

(56) References Cited

U.S. PATENT DOCUMENTS

| 5,797,093 | A | * | 8/1998 | Houde ........................ 455/404.1 |
| 6,128,481 | A | * | 10/2000 | Houde et al. ............... 455/404.2 |
| 6,404,352 | B1 | * | 6/2002 | Ichikawa et al. ............. 340/988 |
| 6,745,021 | B1 | * | 6/2004 | Stevens ...................... 455/404.1 |
| 2001/0051514 | A1 | * | 12/2001 | Lindholm ..................... 455/404 |
| 2002/0160745 | A1 | * | 10/2002 | Wang ........................... 455/404 |

* cited by examiner

*Primary Examiner* — Danh Le
(74) *Attorney, Agent, or Firm* — Troutman Sanders LLP; James E. Schutz; Dustin B. Weeks

(57) ABSTRACT

The present invention is directed to systems and methods for providing emergency messages to a mobile device. In an exemplary embodiment, a system for communicating emergency messages is provided comprising a mobile device comprising an emergency message application and a personal emergency message transceiver, an emergency message control center, wherein the emergency message application is enabled to receive a plurality of emergency messages generated by the emergency message control center.

18 Claims, 10 Drawing Sheets

SYSTEMS AND METHODS FOR PROVIDING EMERGENCY MESSAGES TO A MOBILE DEVICE

CROSS-REFERENCE TO RELATED APPLICATION & PRIORITY CLAIM

This application is a continuation-in-part of U.S. patent application Ser. No. 12/356,358, filed Jan. 20, 2009, and entitled "System and Method For Transmitting An Emergency Message Over An Integrated Wireless Network," which is a continuation of U.S. patent application Ser. No. 10/000,477, filed Oct. 24, 2001, and entitled "System and Method For Transmitting An Emergency Message Over An Integrated Wireless Network," and both are incorporated herein by reference in their entirety as if fully set forth below.

BACKGROUND OF THE INVENTION

1. Field of the Invention

The present invention generally relates to communicating emergency messages and, in particular, to a system and method for generating and transmitting an emergency message through an integrated wireless communication network.

2. Related Art

Emergency messages are generated to indicate that a person is in need of assistance or that an emergency condition is present at property. The emergency message is transmitted to parties capable of rendering assistance.

One example of a conventional personal emergency message is a 911 telephone call. Emergency 911 telephone calls are quickly directed to switchboard operators who are trained to determine the nature of the emergency condition, to determine which type of assistance is required and who should provide the assistance (e.g. firemen, paramedics, police), and where the emergency assistance should be directed to such that the person making the 911 telephone call receives appropriate and timely assistance.

However, emergency 911 telephone calls are limited in the ability to obtain information from the caller requesting emergency assistance. First, the caller must be able to verbally communicate the nature of the emergency to the switchboard operator. Thus, additional information that may be important could, in some instances, not be available if the caller can not talk or is having difficulty communicating. Second, location information can be determined if the telephone is a fixed location type device that can be traced to a known location or address. The location of Cellular and mobile telephones can not be determined unless the caller is capable of telling the operator where the caller is calling from. Furthermore, in many situations, it would be advantageous to have access to other types of information regarding the person calling for emergency assistance. Some illustrative examples of such information includes persons to contact in an emergency, doctor's name, home address or allergies.

Another example of a conventional emergency message is an alarm from a home or business security system. Various automated detection devices sense conditions within the home or business, and summon emergency assistance in the event that one of the monitored parameter are violated. Examples include smoke detected by a smoke detector, opening of a door or window detected by a contact sensor, pressure detected by a pressure sensor, sound detected by a sound sensor, breaking of an infrared light beam detected by an infrared detector and/or motion detected by a motion sensor. Detection of a violation of a monitored parameter may indicate an emergency situation where emergency assistance should be provided to the monitored home or business. Additionally, there may be a personal help request device, such as a panic alarm, special entry code entered on a key pad, a touch button or the like that is configured to indicate that a person in the home or building requires emergency assistance.

However, such conventional home or business security systems are not secure in that such conventional systems communicate with the security monitoring personnel over a conventional telephone system. Thus, damage to the serving telephone system may prevent delivery of the emergency message. For example, an intruder may sever the telephone lines prior to entry into the home or business. Or, a fire may disable the outside phone lines before the fire spreads into the home or building.

Also, such conventional home or business security systems are labor intensive and expensive to install. Hard wire connections are installed between each detecting device and a central security control box. The control box, coupled to the telephone system, is configured to dial up the security monitoring personnel to request emergency assistance when one of the detectors detects a violation of the monitored criteria. Therefore, many hours of installation labor is required to install even a relatively simple home or business security system.

Additionally, such conventional home or business security systems are not automatically configured to contact selected persons when one of the detectors detects a violation of the monitored parameter. Some security monitoring services do call predefined telephone numbers to notify a person of the request for emergency assistance. For example, a homeowner may be called at work by the person monitoring the security system. However, if the homeowner is not at the work telephone, the homeowner may not be timely notified.

Furthermore, such conventional home or business security systems are not configured to receive and respond to remote communications from the homeowner or business employee. For example, the homeowner may desire to authorize a new security password on a temporary basis. Or, the homeowner may desire to remotely deactivate (or activate) the security system rather than having to enter the home to manually enter, via a keyboard, the security password. Furthermore, such passwords must be manually entered within a limited time period (otherwise, an intrusion into the home is assumed). The limited time provided for entering the security code may be particularly inconvenient when the person is bringing into the house (or removing from the house) a number of items, such as boxes, packages, furniture and/or children.

Thus, a heretofore unaddressed need exists in the industry for providing an emergency message system that more accurately indicates the nature, location and other pertinent information of an emergency situation. Also, there is a heretofore unaddressed need in the industry to provide a less expensive to install emergency message home or business security system. Also, there is a heretofore unaddressed need to provide a more convenient and effective emergency message system.

SUMMARY OF THE INVENTION

The present invention overcomes the inadequacies and deficiencies of the prior art as discussed hereinabove. One embodiment of the present invention, an emergency message system, provides a system and method for providing an emergency message such that the appropriate emergency assistance is dispatched in response to the emergency message. The emergency message system employs a transceiver network with a plurality transceivers. A plurality of transceivers are coupled to detection devices at a plurality of customer premises. In one embodiment, one transceiver is coupled to one detection device. The transceivers each have unique identification codes. In one embodiment, transceivers broadcast to and receive radio frequency (RF) signals. A site controller provides communications between the plurality of transceiver units and an emergency message management controller residing in an emergency message system control center.

One embodiment of the present invention can also be viewed as providing a method for communication emergency messages. In this regard, the method can be broadly summarized by the following steps. Generating an emergency message with an emergency message transceiver having at least an identification code uniquely assigned to the emergency message transceiver, and communicating the emergency message from the emergency message transceiver to a network transceiver such that the emergency message is communicated over an intermediate communication system to an emergency message management controller.

Another embodiment of the present invention can be broadly summarized by the following steps. Receiving an emergency message broadcasted from an emergency message transceiver having at least an identification code uniquely assigned to the emergency message transceiver, determining information relevant to the received emergency message by associating the information with the identification code of the emergency message transceiver, and communicating the emergency message and the relevant information such that assistance is summoned in response to the received emergency message.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION a. Overview of the Emergency Message System

In general, the present invention relates to a system and method for communicating an emergency message that is transmitted from a transceiver, through a transceiver network, to an emergency message system control center so that emergency assistance is dispatched in response to the emergency message. The emergency message, in one embodiment, is generated in response to a monitor detecting a violation of a monitored criteria. In other embodiments, the emergency message is generated in response to actuation of a personal emergency message device, a 911 call or upon detection of other signals indicating an emergency condition.

Figure 1:
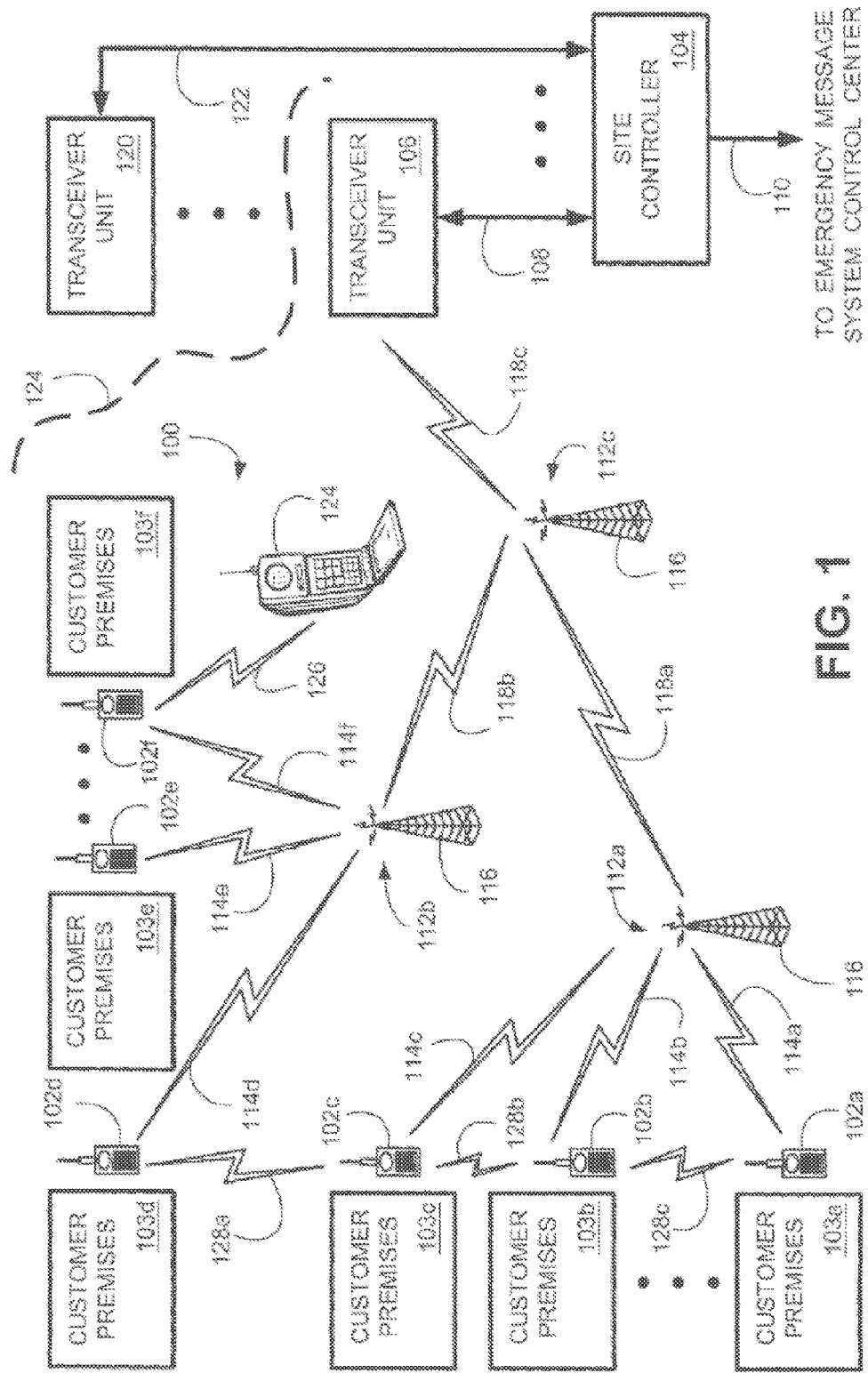
FIG. 1 is a block diagram illustrating a portion of a plurality transceivers residing transceiver network configured to detect and communicate emergency messages.

FIG. 1 is a block diagram illustrating a portion of a transceiver network 100 having a plurality transceivers. Preferably, transceivers 102a-102f (emergency message transceivers) are configured to selectively broadcast and/or receive emergency messages using radio frequency (RF) signals. A site controller 104 provides communications between a transceiver unit 106, via connection 108, and the emergency message system control center 300 (FIG. 3), via connection 110.

Figure 2:
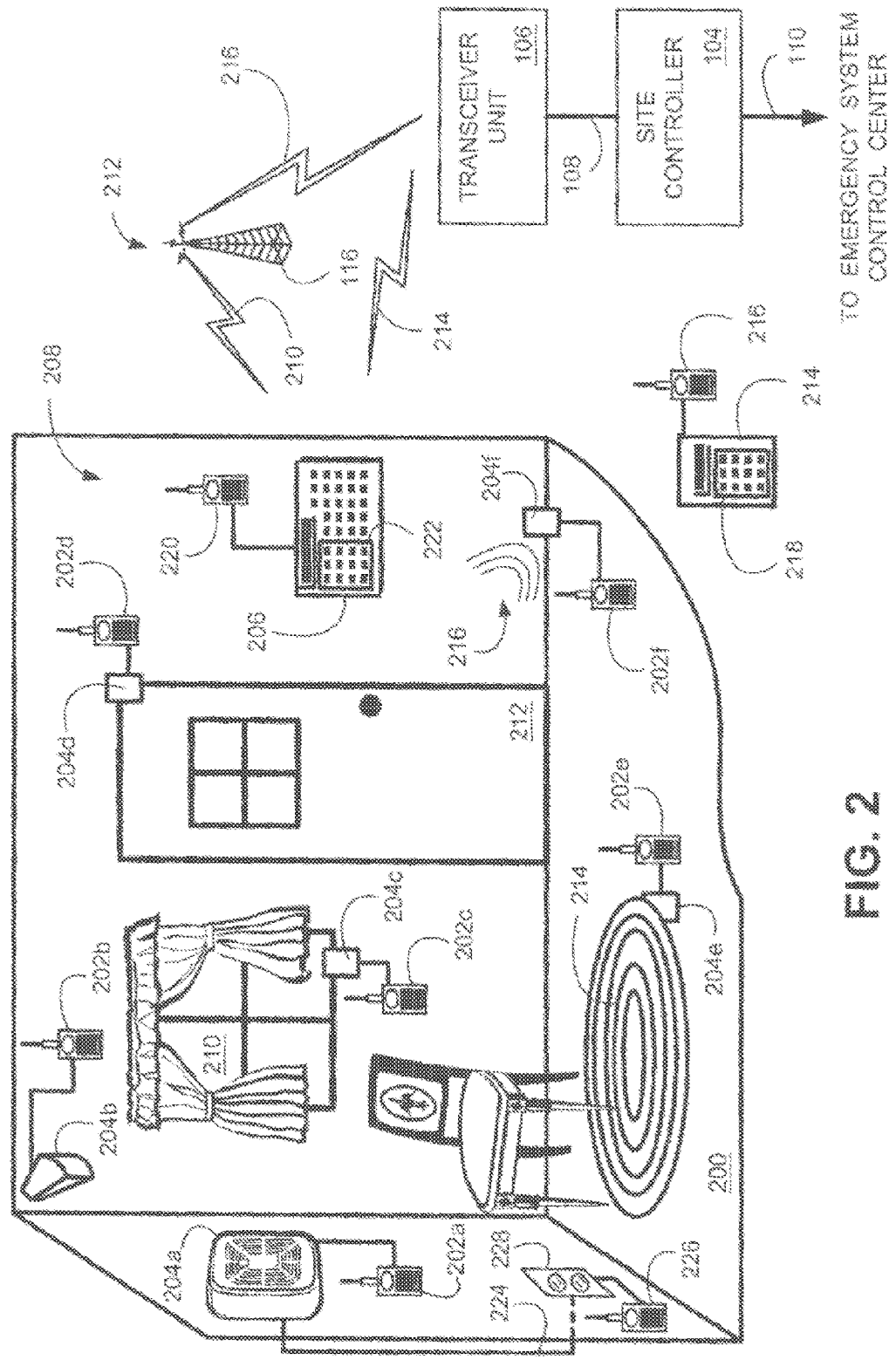
FIG. 2 is a block diagram illustrating selected transceivers coupled to monitoring devices coupled to the transceivers of FIG. 1.

FIG. 2 is a block diagram illustrating one embodiment of an emergency message transceiver system with transceivers 202a-202f coupled to detection devices 204a-204f residing in one of the exemplary customer premises of FIG. 1. The customer premises 200 includes a wall-mounted base station 206 to form an integrated security system 208.

Transceivers 202a-202f detect signals generated by the detection devices 204a-204f that indicate a violation of a monitored parameter, described in greater detail below. In response to receiving a signal from its respective detection device, the transceiver 202a-202f transmits an emergency message via an RF signal 210 that is detected by transmitter station 212. Transmitter station 212, located on a suitable high point, such as a tower 116 (see also FIG. 1), transmits an RF signal 216 to the transceiver unit 106. The transceiver unit 106 communicates the emergency message to the site controller 104 such that the emergency message is relayed on to the emergency message system control center 300 (FIG. 3).

Figure 3:
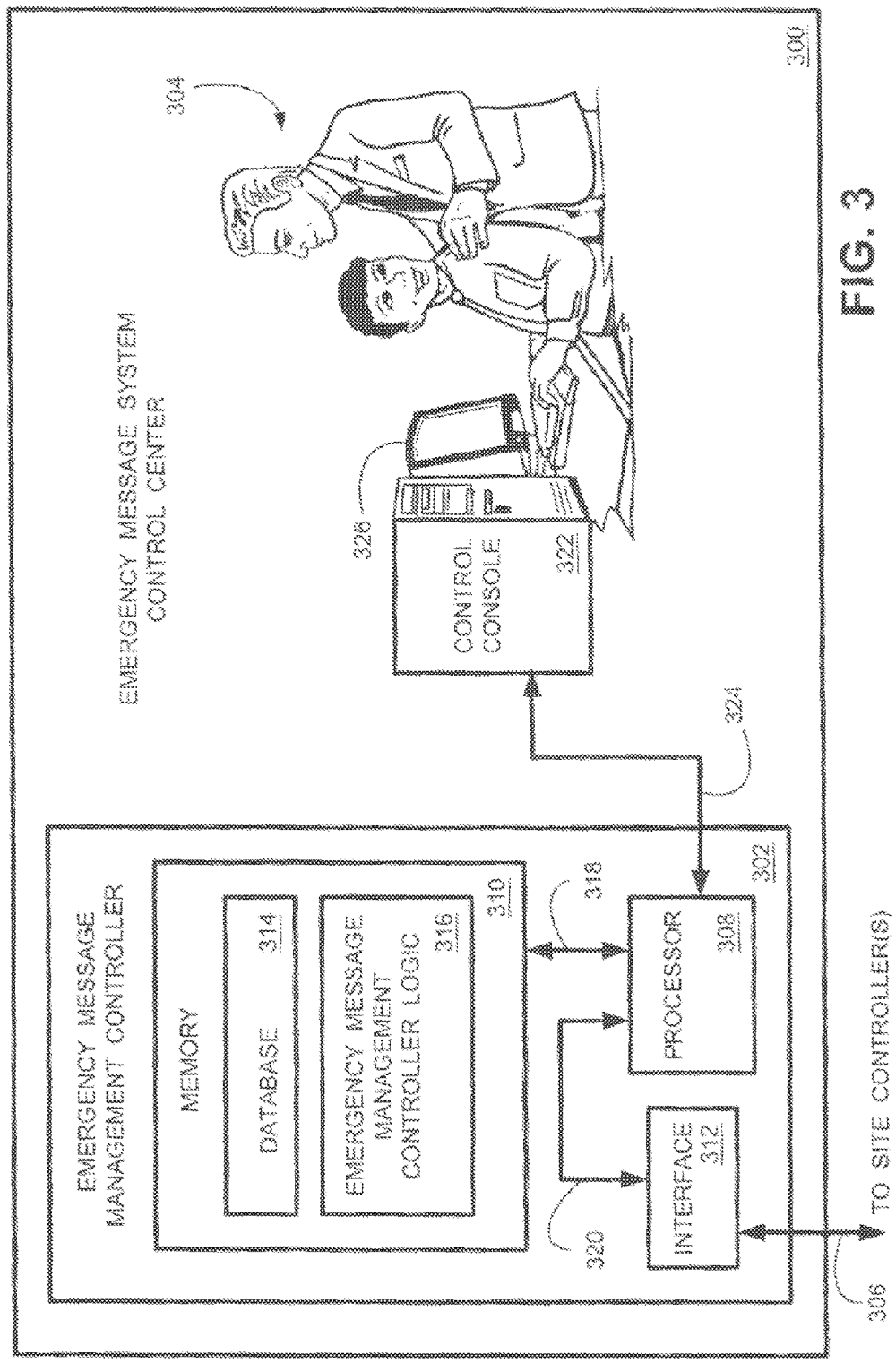
FIG. 3 is a block diagram illustrating selected components of an emergency message system control center in communication with the transceiver network of FIG. 1.

FIG. 3 is a block diagram illustrating selected components of an emergency message system control center 300 in communication with the transceiver network 100 (FIG. 1). The received emergency messages are received by an emergency message management controller 302, described in greater detail below. The emergency message control room operators 304 receive a processed emergency message from the emergency message management controller 302 and initiate appropriate actions in response to the received emergency message. For example, an emergency message received from the customer premises may indicate the presence of a fire. The emergency message control room operators 304 would then place a request to the local fire department to render assistance at the customer premises 200.

b. Emergency Message Transceiver System Environment

FIG. 1 is a block diagram illustrating a portion of a transceiver network 100 in communication with a plurality of transceivers 102a-102f (emergency message transceivers) residing at a plurality of customer premises 103a-103f, respectively. For convenience of illustration, and for convenience of explaining the operation and functionality of the emergency message system, only a few customer premises are illustrated on FIG. 1. A customer premise may be a home, a business or other location. Furthermore, for convenience of illustration, only one transceiver is illustrated at a customer premises 103a-103f. Typically, a plurality of transceivers would be coupled to a corresponding number of devices at the customer premises, one transceiver per device, as will be described in greater detail below.

An emergency message system is configured to receive emergency messages, in a manner described below, from many hundreds of transceivers, even many thousands of transceivers, depending upon the particular architecture that the emergency message system is implemented in. Therefore, the explanation of the operation and functionality of the emergency message system described below is limited to a small segment of the transceiver network 100 for convenience.

A first group of customer premises 103a-103f, each have at least one transceiver 102a-102f, respectively. Each transceiver 102a-102f has a unique, predefined identification code that resides in a memory in the transceiver.

An emergency message transmitted from any one of the transceivers 102a-102f is relayed to the emergency message management controller 302 (FIG. 3) via one or more of the transceiver stations 112a-112c. Preferably, the transceivers broadcast the emergency message using a suitable radio frequency (RF) signal. The emergency message includes at least the identification code of the transceiver generating the emergency message.

For example, transceivers 102a, 102b and 102c are illustrated as transmitting emergency messages via RF signals 114a, 114b and 114c, respectively. Similarly, transceivers 102d, 102e and 102f broadcast emergency messages to transceiver station 112b via RF signals 114d, 114e and 114f, respectively. A transceiver (not shown) in transceiver station 112a is illustrated as communicating a pollution information message to transceiver station 112b via signal 118a. The transceivers 102a-102f, and/or transceivers residing in the transceiver stations 112a-112c, may be identical to each other or be configured to have different characteristics, such as different bandwidths, frequencies and/or signal broadcast strengths.

Each of the transceiver stations 112a-112c detects a broadcasted emergency message from a broadcasting transceiver 102a-102f, depending upon the strength of the broadcasted emergency message and the distance of the transceiver station 112a-112c from the broadcasting transceiver. That is, a transceiver station 112a-112c detects broadcasted emergency messages from any transceivers and/or any transceiver stations in its reception range. Preferably, transceiver stations 112a-112c reside at a suitably elevated location, such as on a tower 116, high building, mountain top or the like to facilitate reception and transmission of emergency messages. Emergency messages from the transceivers 102a-102f are relayed by the transceiver stations 112a-112c to the transceiver unit 106 via RF signals 118a-118c. Each transceiver station has a transceiver (network transceiver) configured to communicate emergency messages with the transceivers 102a-102f, transceiver stations, and/or at least one transceiver unit 106. The transceivers residing in the transceiver station may be the same as one of the transceivers 102a-102f, or be configured to have different characteristics such as different bandwidths, frequencies and/or signal broadcast strengths. In some applications, a unique identification code associated with the broadcasting transceiver station is added to the emergency message.

For example, an emergency message detected by the transceiver station 112a is relayed to the transceiver station 112c via RF signal 118a. The emergency message is then relayed by the transceiver station 112c to the transceiver unit 106 via RF signal 115c. Similarly, an emergency message detected by the transceiver station 112b is relayed to the transceiver station 112c via RF signal 118b. Then, the emergency signal is relayed by the transceiver station 112c to the transceiver unit 106 via RF signal 118c.

One embodiment of the emergency message control system employs transceivers that use standardized digital communication formats such that the information is communicated as packetized units of digital data. Other embodiments employ other suitable communication formats. Other suitable communication formats may be either digital or analog signals.

The transceiver unit 106 converts received emergency messages into a suitable communication signal formatted for communication over a hardwire connection 108. In one embodiment, the transceiver unit 106 formats the received broadcasted RF emergency messages into a standardized RF 232 signal. Another embodiment converts the received emergency messages into a standardized RS 485 signal. A transceiver unit 106 may be configured to convert the received emergency messages from the transceivers 102a-102f and/or transceiver stations 112a-112c of the transceiver network 100 into any suitable signal for transmission over a hardwire interconnection, such as, but not limited to, a metallic conductor, a coaxial cable, an optical fiber cable or the like. In some applications, a unique identification code associated with the transceiver unit 106 is added to the emergency message.

When transceivers (not shown) at many additional customer premises (not shown) are integrated into the transceiver network 100, one skilled in the art will appreciate that a large network of transceivers will be able to communicate emergency messages to the emergency message management controller 302. For convenience of illustration, only a limited number of customer premises 103a-103f are illustrated in FIG. 1. Many other customer premises may be incorporated into the transceiver network 100 such that all of the transceivers of the customer premises are communicating to the emergency message management controller 302 via the transceiver network 100.

A portion of the transceiver network 100 illustrated in FIG. 1 is configured according to the strength of the broadcasted RF signals 114a-114f from the plurality of transceivers 102a-102f, and the strength of the broadcasted signals 118a-118c from the plurality of transceiver stations 112a-112c. Thus, many more customer premises can be configured to communicate with any number of a plurality of transceiver units located out in a serviced area. For example, a transceiver unit 120 is illustrated coupled to the site controller 104 via connection 122. Transceiver unit 120 is configured to communicate with another transceiver network (not shown). Thus, transceiver unit 120 may serve one geographic region and transceiver unit 106 may service a different geographic region. Cut-away line 124 indicates separation of the geographic regions. However, the geographic regions are, in reality, artificial in that any transceiver may communicate with any other transceiver unit so long as its broadcast signal strength is sufficient to be detected by the transceiver unit. Thus, any boundary associated with a geographic reign is easily redefined or changed by simply reconfiguring the defined communication path for a transceiver, as described in greater detail below.

Site controller 104 is configured to communicate with any desired number of transceiver units. Furthermore, a plurality of site controllers can be deployed within a service area, thereby increasing the area of coverage of the transceiver network 100. There are no known limitations that would limit the number of transceivers in communication with the emergency message system control center 300 (FIG. 3) when a suitable number of transceiver units and site controllers are implemented with a plurality of transceivers to form a transceiver network 100.

Site controller 104, in another embodiment, is configured to include other functionalities. Such functionalities may be implemented in a site controller without departing substantially from the operation and functionality of the invention. For example, a site controller 104 may be configured to transmit acknowledgement signals back to the transceiver initiating the emergency message or another designated transceiver. Such an embodiment is particularly advantageous in indicating to a person that emergency assistance is on the way or that an emergency message has been received from a location of interest, such as the person's home or business. In some applications, a unique identification code associated with the site controller 104 is added to the emergency message.

Furthermore, for convenience of illustration, the site controller 104 and the transceiver unit 106 are illustrated as separate components coupled together via connection 108. In another embodiment, the transceiver unit 106 and the site controller 104 are incorporated into a single unit that performs substantially the same functionality of the transceiver unit 106 and the site controller 104. Alternatively, the transceiver unit 106 and site controller 104 may be conveniently included in the same housing. Such an alternative embodiment is particularly advantageous when it is desirable to centrally locate components to provide easy access and/or when it is desirable to enclose the devices in a single environmentally protective enclosure.

Each one of the transceivers, transceiver stations and transceiver units, have a unique identification code, such as a unique alpha-numeric identification code, a hexa-decimal code, or a like identification code. For example, transceiver 102b may have the unique identification code "102b". When an emergency message is relayed by the transceiver 102b to the emergency message management controller 302 (FIG. 3), the emergency message is tagged or otherwise identified with the unique identity code "102b". Thus, the emergency message management controller 302 knows where the transceiver 102b is located since location information for the transceiver 102b is retained in a database 314 (FIG. 3), described in greater detail below. To determine the location of the transceiver generating an emergency message, the emergency message management controller 302 need only associate the location information in the database 314 with the unique identification code of the transceiver since the emergency message contains the identification code of the transceiver. Also, in one embodiment, the nature of the emergency can be determined if the type of detection device coupled to the transceiver 102b is described in the database 314.

Furthermore, the emergency message management controller 302 may specifically poll the transceiver 102b to provide information by broadcasting a signal, using the unique identification code "102b", such that the transceiver 102b recognizes that it is instructed to broadcast the status information back to the emergency message management controller 302. The emergency message management controller 302, via site controller 104, instructs transceiver 106 to broadcast an information request signal to the transceiver 102b. Thus, transceiver unit 106 broadcasts an information request signal to transceiver station 112c. Transceiver station 112c broadcasts the information request signal to transceiver station 112a, which then broadcasts the information request signal to the transceiver 102b.

Similarly, the emergency message management controller 302 is in >communication with all of the individual transceivers of FIG. 1 such that an emergency message is associated with specific transceivers. Furthermore, the emergency message management controller 302 may request information from any desired transceiver integrated into the transceiver network 100.

c. Integrating the Emergency Message Transceiver System into an Emergency Message System Control Center FIG. 3 is a block diagram illustrating selected components of one embodiment of an emergency message system control center 300 in communication with the transceiver network 100. Included as an integral component of the emergency message communication system is the emergency message management controller 302. The emergency message management controller 302 is coupled to at least one of the previously described site controllers 104 via connection 306. Connection 306 is coupled to connection 110 (FIGS. 1 and 2) through an intermediary communication system, described in greater detail below.

The emergency message management controller 302 includes at least a processor 308, a memory 310 and an interface 312. Memory 310 includes at least a database 314 and the emergency message management controller logic 316. Processor 308 is coupled to the memory 310 via connection 318 and is coupled to the interface 312 via connection 320.

When one the plurality of transceivers residing in the transceiver network 100 transmits an emergency message, the emergency message management controller 302 receives the emergency message and stores the received emergency message into database 314 or in another suitable location in a memory. Processor 308 executes the emergency message management controller logic 316 to appropriately store the received emergency message into the database 314 or in another suitable location in a memory. In one embodiment, database 314 employs a look-up table.

The database 314 includes information of interest such as, but not limited to, the identification code of each the transceivers, the location of the transceiver, and the nature of the emergency situation. The nature of the emergency situation in some applications is determined by the type of device to which the transceiver is coupled to. For example, if the transceiver is coupled to a smoke detector, the database 314 includes information indicating that a smoke detector is coupled to the transceiver such that an emergency message received from that transceiver indicates the possible presence of a fire based upon smoke detected by the smoke detector.

Other information of interest may also be included in the database 314. For example, but not limited to, information identifying the specific customer, customers address and/or attributes of the customer's security system may be included within database 314. Also, individuals that should be contacted when an emergency message is received may also be included in the database 314. The nature of the monitoring device that is monitored by the transceiver may also be included within the database 314. Such information pertaining to the nature of the monitoring device includes, but is not limited to, make, model, manufacturer, manufacture date and/or components Accordingly, any type of information of interest may be included within the database 314. Furthermore, information regarding attributes of the transceivers, the transceiver stations, the transceiver units and the site controllers, such as, but not limited to, make, model, manufacturer, manufacture date, components, identification codes and/or locations, may be included in database 314.

Figure 4:
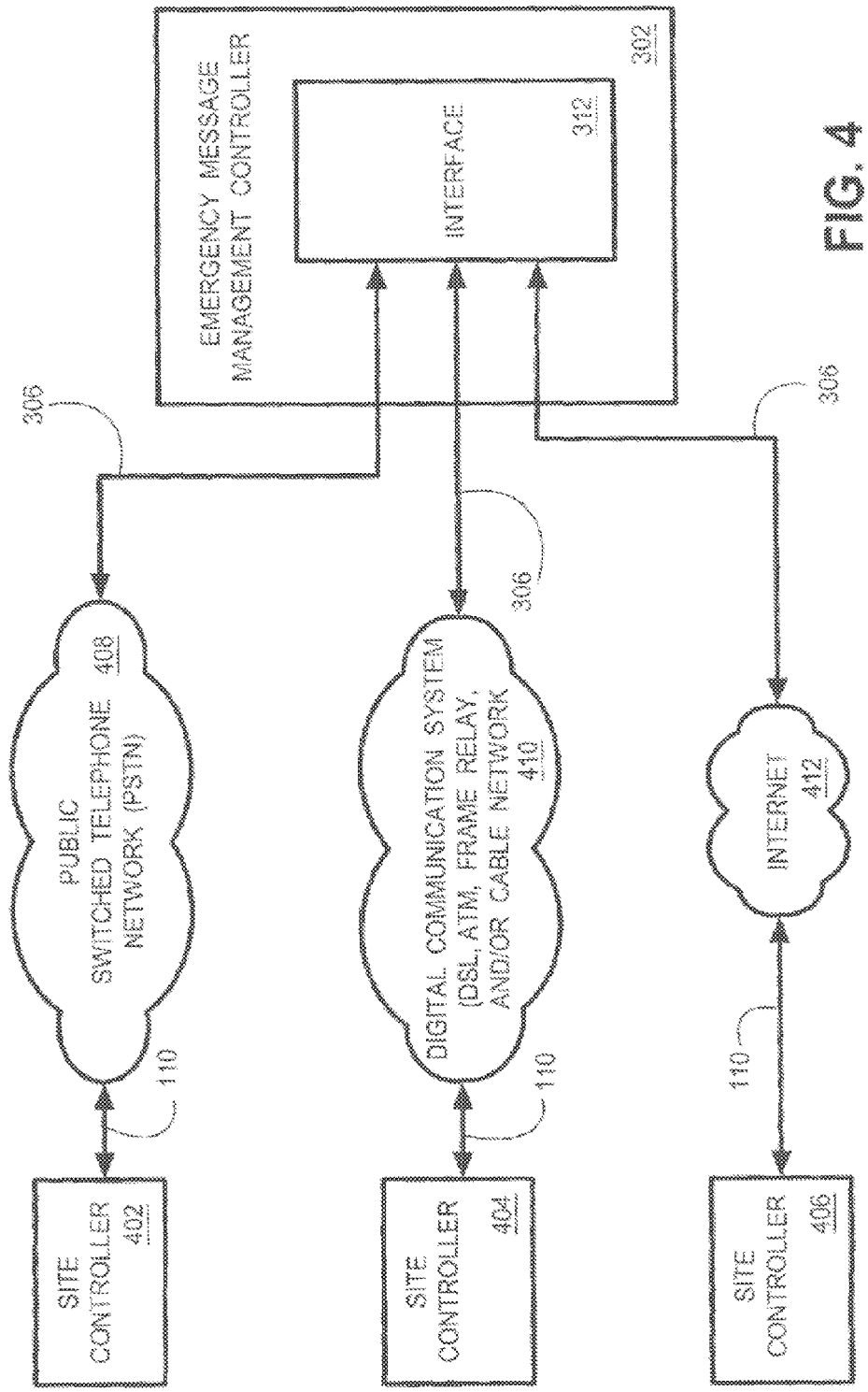
FIG. 4 is a block diagram illustrating alternative intermediate communication systems employed by the emergency message system of FIGS. 1-3.

The emergency message management controller 302 is illustrated as being coupled to the control console 322, via connection 324. Typically, the control room operators 304 interface with the various components residing in the emergency message system control center 300 via one or more control consoles 322. Information is displayed on a suitable interface device, such as a display screen 326. Thus, a control room operator 304, after determining a valid emergency message is received, requests appropriate emergency assistance from the appropriate emergency provider.

d. Communication Between Site Controllers and the Emergency Message Management Controller As described above with reference to FIGS. 1-3, a site controller 104 (FIGS. 1 and 2) is in communication with the interface 312 residing in the emergency message management controller 302 (FIGS. 3 and 4). FIG. 4 is a block diagram illustrating alternative intermediate communication systems employed by the emergency message communication system. Three exemplary site controllers 402, 404 and 406 are illustrated as being coupled to the interface 312 residing the emergency message management controller 302 via three communication systems. These exemplary intermediate communication systems are intended to illustrate some possible communication systems through which the connections 110 (FIGS. 1-2) and 306 (FIG. 3) may coupled to such that the emergency message communication system enables communication between the site controllers and the emergency message management controller 302.

Site controller 402 is communicating to interface 312 via a public switched telephone network (PSTN) 408, via connections 110 and 306. Thus, site controller 402 is configured to provide a suitable signal having an emergency message that is provided to the PSTN 408. PSTN 408 receives the suitably configured emergency message from the site controller 402 and relays the emergency message to the interface 312. Interface 312 converts the received emergency message from the PSTN 408 and reformats the emergency message into a suitable communication signal that is provided to processor 308 (FIG. 3) such that the emergency message is stored in the database 314 (FIG. 3) in a manner described above.

In one embodiment, when the emergency message management controller 302 issues an acknowledgement signal, the interface 312 converts the acknowledgement signal into a suitable signal formatted for communication over the PSTN 408. The suitably formatted acknowledgement signal is then communicated through the PSTN 408 and is transmitted to the site controller 402 via connections 306 and 110. The site controller 402 then converts the received acknowledgement signal from the PSTN 408 into a suitably formatted signal for transmission out to the selected transceiver(s) as described above.

The components (not shown) residing in the interface 312 and the site controller 402 that are configured to transmit, receive and convert signals from the PSTN 408 are known in the art and, therefore, are not described in detail herein other than to the extent necessary to understand the operation and functioning of these components when employed as part of the interface 312 and the site controller 402. Such known components are too numerous to describe in detail herein, and that any configuration of such known components having the above-described functionality may be implemented in the interface 312 and the site controller 402 without departing substantially from the emergency message control system. Any such implementation of components configured to receive and convert communication signals from PSTN 408 are intended to be within the scope of this disclosure and to be protected by the accompanying claims.

Site controller 404 is communicating to interface 312 via a digital communication system 410, via connections 110 and 306. Thus, site controller 404 is configured to provide a suitable signal having an emergency message that is provided to the digital communication system 410. The digital communication system 410 is a based communication system configured to communication information in a digital format. Non-limiting examples of such digitally based communications systems include digital subscriber loops (DSL), X.25, Internet protocol, (IP), Ethernet, Integrated services digital network (ISDN) and asynchronous transfer mode (ATM). Such digital communication systems may employ a PSTN, a frame relay based network and/or cable network. Furthermore, such digital communication systems may employ combinations of the above-described systems having a plurality of segments employing different technologies on each segment.

The digital communication system 410 receives the suitably configured emergency message from the site controller 404 and relays the information to the interface 312. Interface 312 converts the received emergency message from the digital communication system 410 and reformats the emergency message into a suitable communication signal that is provided to processor 308 (FIG. 3) such that the emergency message is stored in the database 314 (FIG. 3) in a manner described above.

In one embodiment, when the emergency message management controller 302 issues an acknowledgement signal, the interface 312 converts the acknowledgment signal into a suitable signal formatted for communication over the digital communication system 410. The suitably formatted acknowledgement signal is then communicated to the digital communication system 410 and is transmitted to site controller 404, via connections 306 and 110. The site controller 404 then converts the received acknowledgement signal from the digital communication system 410 into a suitably formatted signal for transmission out to the selected transceiver(s) as described above.

The components (not shown) residing in the interface 312 and site controller 404 that are configured to received and convert signals from the digital communication system 410 are known in the art and, therefore, are not described in detail herein other than to the extent necessary to understand the operation and functioning of these components when employed as part of the interface 312 and the site controller 404. Such known components are too numerous to describe in detail herein, and that any configuration of such known components having the above-described functionality may be implemented in the interface 312 and the site controller 404 without departing substantially from the emergency message communication system. Any such implementation of the components configured to receive and convert communication signals from the digital communication system are intended to be within the scope of this disclosure and to be protected by the accompanying claims.

Site controller 406 is communicating to interface 312 via a Internet system 412, via connections 110 and 306. Thus, site controller 406 is configured to provide a suitable emergency message to the Internet system 412. Internet system 412 receives the suitably configured emergency message from the site controller 406 and relays the information to the interface 312. Interface 312 converts the received emergency message from the Internet system 412 and reformats the emergency message into a suitable communication signal that is provided to processor 308 (FIG. 3) such that the emergency message is stored in the database 314 (FIG. 3) in a manner described above.

When the emergency message management controller 302 issues an acknowledgement signal, the interface 312 converts the acknowledgement signal into a suitable signal formatted for communication over the Internet system 412. The suitably formatted acknowledgement signal is then communicated through the Internet system 412 and is transmitted to the site controller 406, via connections 306 and 110. The site controller 406 then converts the received acknowledgement signal from the Internet system 412 into a suitably formatted signal for transmission out to the selected transceiver(s) as described above.

The components (not shown) residing in the interface 312 and the site controller 406 that are configured to transmit, receive and convert signals from the Internet system 412 are known in the art and, therefore, are not described in detail herein other than to the extent necessary to understand the operation and functioning of those components when employed as part of the interface 312 and the site controller 406. Such known components are too numerous to describe in detail herein, and that any configuration of such known components having the above-described functionality may be implemented in the interface 312 and the site controller 406 without departing substantially from the emergency message communication system. Any such implementation of components configured to receive and convert communication signals from the Internet system 412 are intended to be within the scope of this disclosure and to be protected by the accompanying claims.

Other embodiments of the site controllers and the interface 312 are configured to communicate with other communication networks or combination networks having a plurality of segments employing different communication technologies on each segment. For example, a site controller and a interface could be configured to communicate over satellite based communication systems. Another example includes a combination system that employs the PSTN 408 and the Internet system 412. Such a combination system includes an interface device to interface the PSTN 408 with the Internet system 412. There are no intended limitations with respect to the interfacing communication technology through which a site controller and an interface 312 (FIG. 3) communicate. Any such implementation of a site controller and an interface 312 configured to communicate through a communication technology in accordance with the operation and functionality of the emergency message system described herein is intended to be within the scope of this disclosure and to be protected by the accompanying claims.

One embodiment of the site controller and/or interface 312 employs a plurality of standardized components, and is configured to receive an interface card. The interface card is configured to provide connectivity to the communication system that is used by the emergency message communication system to communicate over. Such an embodiment is particularly suited to implementing a mass produced emergency message system.

One embodiment of the site controller includes additional components (not shown) that apply an encryption to emergency messages transmitted to the emergency message management controller 302 (FIG. 3). Similarly, the interface 312 (FIG. 3) may be configured to transmit encrypted emergency messages. The received emergency messages are decrypted by the receiving device. Such an embodiment is desirable when security of the emergency message is important, such as, but not limited to, emergency messages generated by transceiver employed in an integrated security system 208 (FIG. 2).

e. Embodiment of an Emergency Message Transceiver in an Integrated Security System FIG. 2 is a block diagram illustrating one embodiment of an emergency message transceiver system with transceivers 202a-202f. Each one of the transceivers 202a-202f are coupled to an exemplary detection device 204a-204f residing in one of the exemplary customer premises of FIG. 1. In one embodiment, the customer premises 200 includes a wall-mounted base station 206 to form an integrated security system 208, as described below. Such an integrated security system is suitable for installation in a residence, business or other type of customer premises.

The exemplary detectors 204a-204f illustrate selected types of a variety of detection devices that may be employed as part of an integrated security system 208. For example, detector 204a is configured to detect the presence of smoke. Thus, smoke detector 204a indicates a possible fire at the customer premises 200 when smoke is detected.

Detector 204b is configured to sense movement of intruders within the customer premises 200. Detector 204c is configured to detect the opening of window 210. Similarly, detector 204d is configured to detect the opening of door 212. Detector 204e is a pressure sensitive detecting device that detects the pressure of an intruder walking over the carpet 214. Detector 204f is configured to detect sound waves 216, such as sound associated with glass breakage or forced entry through the door 212. Thus, detectors 204b-202f are configured to detect an intrusion into the customer premises 200 so that an emergency message may be generated.

In one embodiment, each of the detectors 204a-204f are coupled to a transceiver 202a-202f, respectively, such that the emergency message is broadcasted out to the transceiver station 212 via signal 210. Since each transceiver has a predefined unique identification code, the identification code is used by the energy message management controller 302 to identify the detectors 204a-204f.

For convenience of illustration, the transceivers 202a-204f are illustrated as residing outside each of its respective detectors and coupled to its respective detector by a connection. Such an embodiment is particularly advantageous for retrofitting detectors of an existing home security systems into the integrated security system 208.

Alternatively, the transceivers 202a-202f are fabricated into each one of its respective detectors during the manufacturing process as an internal integrated component. Such an embodiment is particularly advantageous in providing for an integrated security system 208 that is easily installed with a minimum of labor and expense. That is, since each detection device includes an internal transceiver configured to transmit emergency messages, the installation of the detectors in the customer premises 200 may be effected without the installation of signal wires to a central control panel in a home security system.

Furthermore, the integrated security system 208 does not necessarily require a control panel in that each of the transceivers 202a-202e are configured to communicate directly with any transceiver station within its broadcast range, such as transceiver station 212. Furthermore, if the transceiver unit 106 is in a sufficiently close proximity to the transceivers 202a-202e, emergency message signals broadcasted by the transceivers 202a-202e may be directly detected by the transceiver unit 106 via signal 218.

The integrated security system 208 may include other components. Such components may be coupled to a transceiver, or may include a transceiver as an internal integrated component, as described above. In one embodiment, control panel 206 may be configured to coordinate with the other detectors 202a-202e. For example, a person authorized to enter the customer premises 200 may enter the customer premises and activate the motion detector 204b, the door opening detector 204d, the pressure detector 204e and/or the noise detector 204f. The corresponding transceivers 202b, 202d, 202e and/or 202f generate an emergency broadcast signal that is detected by the control panel transceiver 220. Since the broadcasting transceiver(s) 202b, 202d, 202e and/or 202f are uniquely identified by their predefined identification code, the emergency message management controller 302 (FIG. 3) determines which of the detectors 204b, 204d, 204e and/or 204f have detected an intruder.

The control panel 206 is then configured to allow a predefined period of time for the person entering the customer premises 200 to enter a security number or the like, via a keypad 222, such that the integrated security system 208 recognizes that the person is authorized to enter the customer premises 200. Accordingly, the control panel 206 employs the transceiver 206 to broadcast an emergency message indicating that a proper security code has been received and that the person entering the customer premises 200 is an authorized person. Thus, when the emergency signal from one or more of the transceivers 202b, 202d, 202e and/or 202f is followed by an emergency message from the transceiver 200 indicating that an appropriate security code has been timely received, the emergency message management controller 302 (FIG. 3) receiving the emergency messages understands that the person entering the customer premises 200 is an authorized person and not an intruder. However, if the control panel 206 does not generate an emergency message indicating that an appropriate security code has been received, the emergency message management controller 302 understands that an intruder in the customer premises 200 has been detected and then generates an appropriately configured emergency message that is transmitted to the control room operators 304, via the control console 322 (FIG. 3). The control room operators would then request suitable emergency assistance at the customer premises 200.

Similarly, smoke detector 204a may detect the presence of smoke such that the transceiver 202a transmits a corresponding emergency signal. If a person in the customer premises 200 is merely cooking dinner and burns some of the food, thereby generating the detected smoke, an actual fire condition may not be present. Thus, the person may enter a predefined security code through the control panel 206 such that an emergency message signal is transmitted by the transceiver 220, thereby indicating to the energy message management controller 302 that a fire is not present at the customer premises 200.

In one embodiment, the emergency message management controller 302 may indicate to the control room operators 304 that the smoke detector 204a has detected smoke, but that the received security code indicates that an actual fire is not present and that emergency service from the fire department need not be summoned. Alternatively, another embodiment may not notify the control room operators 304 that the smoke detector 204a has detected smoke if the security code is received in a timely manner. However, with either embodiment, if the security code is not received by the control panel 206, an emergency message is transmitted to the control room operators 304 indicating the detection of smoke by the smoke detector 204a.

Because each transceiver 202a-202f is identified by a unique identification code, location information for each transceiver residing in the database 314 (FIG. 3) is used to precisely identify the location of the broadcasting transceiver, and therefore precisely identify the location of the emergency. Since the received emergency message includes the unique identification code of the transceiver generating the emergency message, the location is determined by associating the identification code of the transceiver with information residing in database 314 (FIG. 3). Furthermore, additional information residing in the database 314 may indicate the nature of the emergency and/or provide other relevant information. For example, a message received from transceiver 202a, coupled to the smoke detector 204a (FIG. 2), may indicate that the smoke detector 204a has detected smoke. Accordingly, the control room operators 304 can summon emergency assistance from the fire department and direct the fire department personnel to the address of the customer premises 200 when an emergency message is received from the transceiver 202a.

Similarly, if an intruder opens the window 210 such that the detector 204c detects the window opening, the transceiver 202c transmits an emergency message to the energy message management controller 302. Because the transceiver 202c is uniquely identified and the location of the transceiver 202c is specified in the database 314, the control room operators 304 upon receiving the emergency message and the address location of the customer premises 200 could summon the police to investigate the presence of the opened window 210.

As described above, emergency messages generated by any one of the detectors 204a-204f causes the emergency signal to be relayed through the transceiver network 100 (FIG. 1) such that the emergency message is received and processed by the emergency message management controller 302. In an alternative embodiment, the control panel 206, or other suitable coordination device, is configured to detect and recognize emergency messages broadcasted by the transceivers 202a-202f. Other transceivers within the broadcasting range of the transceivers 202a-202f are configured to ignore emergency messages broadcasted by the transceivers 202a-202f. Since the broadcasting transceiver(s) 202b, 202d, 202e and/or 202f are uniquely identified by their predefined identification code, the control panel 206 determines which of the detectors 204b, 204d, 204e and/or 204f have detected an intruder.

Accordingly, if the appropriate security code is not received in a timely manner by the control panel 206, a single emergency message is broadcasted by the transceiver 220 to the emergency message management controller 302 (FIG. 3) in the manner described above. If a security code is received in a timely manner, no emergency message is broadcasted by the transceiver 220. That is, the control panel 206, or other suitable coordinating device, coordinates emergency messages of the integrated security system. Such an embodiment is particularly desirable when it is desirable to reduce the number of emergency messages transmitted to the emergency message management controller 302.

For example, in the above-described embodiment employing the control panel 206 as a coordinator of emergency messages for the integrated security system 208, the presence of an intruder may be detected by the motion detector 204b.

An emergency message broadcasted by the transceiver 202b is detected by the transceiver 220 and relayed to the control panel 206. Should the transceiver station 212 be within the broadcast range of the transceiver 202b, a transceiver (not shown) residing in the transceiver station 212 is configured to ignore any emergency messages from the transceiver 202b. Accordingly, if the authorized security code is not received in a timely manner by the control panel 206, a single emergency message is broadcasted by the transceiver 220. The transceiver residing in the transceiver station 212 is configured to detect the emergency message from the transceiver 220, thereby relaying the emergency message to the emergency message management controller 302, as described above.

The integrated security system 208 may further include a personal security device 214. The personal security device 200 is coupled to or included as an internal component a transceiver 216. The transceiver 216, in one embodiment, is configured to communicate with the control panel 206. Thus, if an authorized person desires to enter the customer premises 200, the person enters the appropriate security code through a keypad 218 on the personal device 214. The transceiver 216 relays the security code signal to the transceiver 206 such that the control panel 200 recognizes that a valid security code has been received. Accordingly, the control panel 206 generates an emergency signal, broadcasted by the transceiver 220, indicating that the security code has been received in a timely manner. Alternatively, in an embodiment employing a control panel 206 is a coordinator of emergency messages, the transceiver 220 does not broadcast an emergency message upon receiving the security code in a timely manner.

In another embodiment, the personal device 214 generates an emergency signal having the security code such that the transceiver 216 directly transmits the security code to the energy message management controller 302. Thus, the personal device 214 is forming the same functionality as the control panel 206. Here, the integrated security system 208 would not necessarily employ the control panel 206, but employs one or more of the personal devices 214 to broadcast an emergency message indicating that the security code has been received in a timely manner.

Furthermore, the personal device 214 provides a convenient way for a person to remotely arm the integrated security system 208. That is, a person arms the integrated security system 208 from outside of the house. Such a feature is convenient if the person desires to arm the integrated security system 208 when leaving the customer premises 200. Similarly, the person may arm the integrated security system 208 when inside the customer premises 200. For example, if the integrated security system 208 is installed in a residence, the person may arm the integrated security system 208 from the bedside or other convenient location.

The exemplary detectors 204a-204f described above are intended to merely illustrate a few of the wide variety of detectors and other devices that are integrated into the integrated security system 208. Other types of suitable detectors include, but are not limited to, detectors for water, moisture, temperature or humidity. Such detectors are configured to generate an emergency message that is broadcasted by a transceiver coupled to or residing in the detector.

Furthermore, a variety of appliances, such as but not limited to, a TV or a toaster, are easily be integrated into the integrated security system 208. For example, it may be desirable to monitor the operating status of a toaster for safety reasons. Thus, if a toaster is left on after use, the transceiver generates an emergency message indicating that the toaster has inadvertently been left on such that a potential fire hazard is created. Accordingly, the control room operators could initiate an appropriate response to ensure that the toaster is turned off before a fire occurs. For example, the control room operators 304 could summon the fire department or contact the owner of the customer premises 200.

As described above, the exemplary detector 204a-204f are described as detector devices installed in a fixed location within the customer premises. Such devices may be installed in other convenient locations, such as, but not limited to, outside the customer premises.

Furthermore, the detectors may be portable or moveable. For example, but not limited to, the motion detector 204b (and its associated transceiver 202b) may be relocated to another location within the customer premises 200 to change the are of coverage provided by the motion detector 204b.

Also, the detectors may be installed on moveable property, such as an automobile, truck, boat, airplane, art object or the like. In another embodiment, a transceiver is coupled to or integrated within a monitor that is attached to a person. Such an embodiment may be particularly advantageous when the detector is monitoring a health condition, such as a person's heartbeat rate or the like, or when the detector is determining location, such as the location of a child, pet, art object or the like.

In yet another embodiment, emergency messages are relayed directly to the personal security device 214 such that the person possessing the personal security device 214 is made aware of the emergency messages from the integrated security system 208. The emergency management controller 302 (FIG. 3) communicates the emergency message out into the network 100 (FIG. 1). Since the personal security device is identified by a unique identification code, the message is directed to the personal security device 214 by including the identification code of the personal security device 214 in the emergency message. One embodiment employs a beeper or other noise generator, a light indicator, a vibrator or the like to get the attention of the person.

For example, if the person is at work, and an intruder enters the customer premises 200 such that the motion detector 204b causes the transceiver 202b to broadcast an emergency message, the person is directly notified of the emergency message. The emergency message broadcasted by the transceiver 202b (assuming the failure to receive an appropriate security code entry) is broadcasted out to the transceiver station 212. The transceiver station 212 relays the emergency message, via transceiver unit 106 and the site controller 104, to the emergency message management controller 302 (FIG. 3). The emergency message management controller 302 then causes an emergency message to be transmitted to the personal security device 214 so that the owner of the customer premises 200, or another appropriate individual, is aware that the motion detector 204b has detected the presence of an intruder.

f. Embodiment of an Always-On Appliance Transceiver

Figure 5:
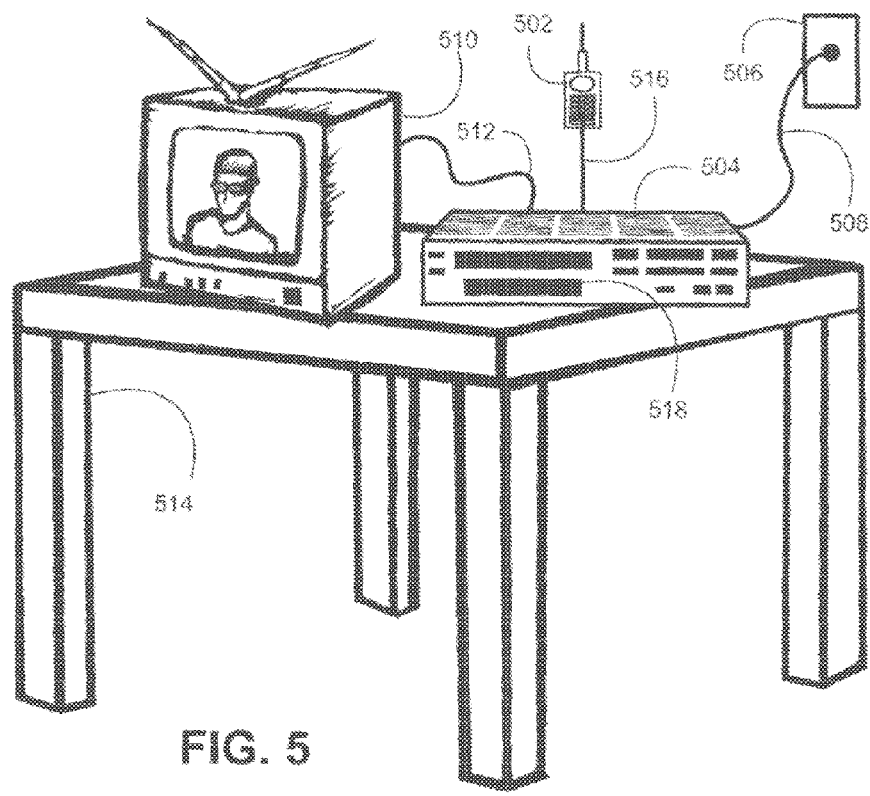
FIG. 5 is a block diagram illustrating an embodiment of an emergency message transceiver coupled to an always-on appliance unit residing in the customer premises.

FIG. 5 is a block diagram illustrating an embodiment of an emergency message transceiver 502 coupled to an always-on appliance unit 504 residing in the customer premises. The exemplary always-on appliance unit 504 is illustrated as a cable television (TV) set box. Other suitable always-on appliances may be configured to communicate with an emergency message transceiver 502. For example, a home personal computer (PC), a security alarm system control panel, a digital telephone/message system, or a fax machine are other examples of suitable always-on appliances configured to operate with a transceiver of the present invention. Such always-on appliances typically include a display device such that an emergency message could be indicated to a person viewing the display device. Furthermore, the always-on appliance may be a mobile appliance such as a pager, cell phone or the like.

The phrase "always-on appliance" as used herein designates an appliance that is probably on for periods of time such that a person viewing the appliance for its normal intended use is likely to be notified of a received emergency message. For example, a TV may not always be on, but rather on for periods of time. Similarly, a pager may be occasionally turned off, such as when the user is in a theater or sleeping at night. Such devices are considered as always-on appliances herein.

According to the exemplary system illustrated in FIG. 5, the cable TV set box 508 is coupled to an external TV cable system (not shown) via a cable 506 that is coupled to a cable TV wall outlet 508. TV signals from the cable TV network are provided to the TV 510 via cable 512. For convenience, the cable TV set box 504 and the TV 510 are illustrated as sitting on the table 514. The emergency message transceiver 502 is coupled to the cable TV set box 504 via connection 516. Alternatively, the emergency message transceiver 502 is incorporated internally within the cable TV set box 504 as an integral integrated component.

When an emergency message is received by the emergency message management controller 302 (FIG. 3), it may be desirable to communicate the emergency message to an individual in close proximity to the always-on appliance.

For example, a tornado detector may detect the possible presence of a tornado. An emergency message transceiver (not shown) coupled to the tornado detector (not shown) generates an emergency message to the emergency message management controller 302. The transceiver coupled to the tornado detector has a predefined unique identification code. Because the location of the transceiver coupled to the tornado detector is precisely known, since the identification code of the transceiver is associated with data in the database 314 (FIG. 3), the emergency message management controller 302 generates an emergency message that is broadcasted out to the emergency message transceiver 502. The emergency message is directed to the emergency message transceiver 502 by specifying the unique identification code of the emergency transceiver 502 in the broadcasted emergency message. Furthermore, the emergency message may be directed to many different locations by specifying identification codes in the emergency message.

Similarly, the transceiver 502 can be configured to receive an emergency message generated by one of the above-described transceivers 202a-202f employed in an integrated security system 208 (FIG. 2). Also, the transceiver 502 can be configured to receive an emergency message generated by one of the above-described transceivers 216, or a personal emergency message transceiver 602 described below, or a transceiver configured to detect emergency 911 calls as described below. Accordingly, a person viewing the always-on device is made aware that one of the transceivers 202a-202f coupled to detection devices 204a-204f, or the wall-mounted base station 206, have generated an emergency message. As described above, the emergency message communicated to the always-on appliance includes other information of interest, such as, but not limited to, the nature of the emergency situation.

In one embodiment, the emergency message transceiver 502 is configured to generate an emergency message signal that is configured to be displayed on the always-on appliance. Such an embodiment includes a signal generator (not shown) that process the received emergency message into a signal suitably formatted for the always-on appliance. In the exemplary system illustrated in FIG. 5, an emergency message is displayed on a display 518 residing on the cable TV set box 504. Furthermore, another embodiment is configured to generate an appropriate emergency message on the TV 510 such that a person viewing the TV 510 would understand that a tornado, and its corresponding location, has been detected.

Some embodiments of the always-on appliance are configured to receive communications from a person that has received the emergency message. For example, the always-on appliance may be a PC. Accordingly, when the user of the PC receives the emergency message, the user may respond with a request for additional information and/or may request emergency assistance. For example, if the received emergency message indicates that a tornado has been detected in close proximity to the emergency message transceiver 502, the user of the PC may request emergency help to effect an evacuation of the premises. Such an embodiment may be particularly useful if physically impaired people and/or small children requiring assistance in evacuations are nearby the always-on appliance.

In yet another embodiment, the request for additional information or for emergency assistance is made using the control panel 206 and/or the personal security device 214 (FIG. 2). Here, the person receiving the emergency message from the always-on appliance uses the keyboards coupled to the control panel 206 and/or the personal security device 214 to generate an emergency message requesting additional information and/or emergency assistance to the transceiver 502. The transceiver 502 then relays the request for additional information or emergency assistance back to the energy message management controller 302 (FIG. 3). Accordingly, the control room operators 304 provides the additional information and/or request emergency assistance from the appropriate public emergency service agencies.

g. Embodiment of a Personal Emergency Transceiver

Figure 6:
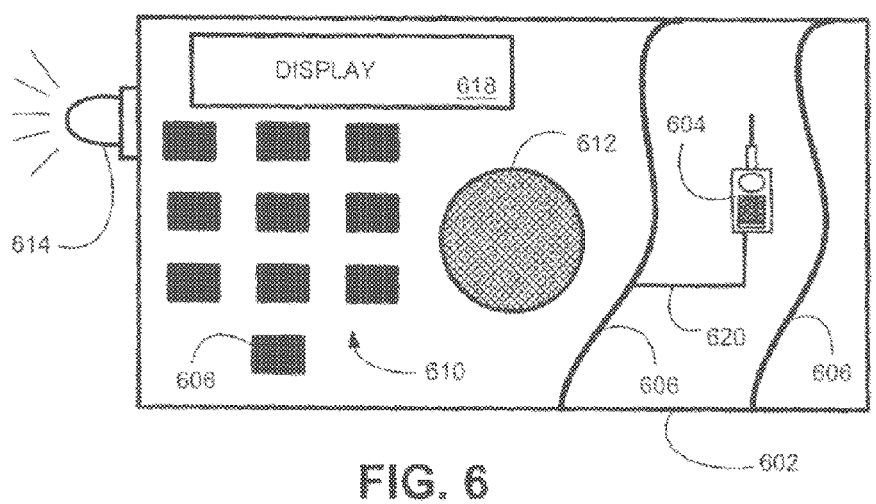
FIG. 6 is a block diagram illustrating an embodiment of a personal emergency message transceiver.

FIG. 6 is a block diagram illustrating an embodiment of a personal emergency message transceiver 602. The personal emergency transceiver 602 includes a transceiver 604 in accordance with the present invention. The transceiver 604 includes or is coupled to a memory (not shown) having a predefined unique identification code.

For convenience of illustration, the transceiver 604 is illustrated as an internal component of the personal emergency message transceiver 602, as indicated by the two cut-away lines 606. One embodiment of the personal emergency message transceiver 602 includes at least one button 608. Button 608 may be any suitable pressure sensitive device or switch device that is manually actuated by a person. Another embodiment includes a keypad 610 having a plurality of push buttons or the like. Another embodiment includes a speaker 612, a light 614, a display 618, and/or a microphone (not shown). Other embodiments may employ various combinations of the button 608, the keypad 610 and the speaker 612.

The personal emergency message transceiver 602 is preferably a very small, easy to carry device. The personal emergency message transceiver 602 is sufficiently small to conveniently carry in a person's pocket, clip onto the person's belt or the like, fit into a purse and/or attach to a key chain or other convenient apparatus.

Each of the above-described embodiments of the personal emergency message transceiver 602 are configured to generate and/or receive signals to and/or from the transceiver 604, via connection 620. For example, the button 608 is configured to generate a signal such that when the person using the personal emergency message transceiver 602 actuates button 608, an emergency message (which includes the unique identification code of the emergency message transceiver 602) is broadcasted by the transceiver 604. The emergency message broadcasted by the transceiver 604 is detected by any other transceiver of the transceiver network 100 (FIG. 1) such that the detected emergency message is relayed to the emergency message management controller 302 (FIG. 3) by the network transceivers in the manner described above. As the first network transceiver relays the emergency message, the network transceiver adds its unique identification code to the emergency message. When the emergency message reaches the emergency management controller 302, the emergency message includes the unique identification code of the broadcasting personal emergency message transceiver 602 and the first network transceiver. (Other embodiments may include the identification code of all network transceivers relaying the emergency message to the emergency message management controller 302.)

Although the exact location of the personal emergency message transceiver 602 is not precisely known because the emergency message transceiver 602 itself is portable, the precise location of the first network transceiver relaying the broadcasted emergency message is precisely known [since location information for the first relaying network transceiver resides in the database 314 (FIG. 3)]. Accordingly, the emergency message management controller 302, based upon the known location of the receiving transceivers, may closely approximate the location of the personal emergency message transceiver 602. Furthermore, if multiple transceivers in the transceiver network 100 detect the broadcasted emergency message from the transceiver 604, the emergency message management controller logic 316 executes a position determination algorithm to triangulate more precisely the location of the personal emergency message transceiver 602.

In the embodiment of the personal emergency message transceiver 602 employing a keypad 610, the person using the personal emergency message transceiver 602 uses the keypad 610 to generate alpha-numeric messages. For example, an alpha-numeric message may indicate a need for a particular type of emergency assistance, such as an ambulance, the police, the fire department or a tow truck. One embodiment of the personal emergency message transceiver 602 employs a number of push buttons or the like, each configured for a particular type of emergency situation. For example, one button may selectively indicate a need for an ambulance, and another button may indicate the need for a tow truck. Another embodiment of the personal emergency message transceiver 602 is configured with a plurality of buttons, or the like, each button being associated with one or more alphanumeric characters. Accordingly, the user of such an embodiment having a keypad with a plurality of buttons associated with alpha-numeric characters may generate a customized emergency message that is broadcasted by the transceiver 604. For example, the person using the personal emergency message transceiver 602 could generate a message such as "call wife, working late at home" or another suitable message.

An embodiment of the personal emergency message transceiver 602 employing a speaker 612 provides for audible communications with the person using the personal emergency message transceiver 602. For example, the personal emergency message transceiver 602 generates a sound to indicate to the user that an emergency message of interest has been received. Accordingly, the audible sound may prompt the user to call into the emergency message management controller 302 if an intruder has been detected, in a manner described above, at the customer premises 200 by the integrated security system 208 (FIG. 2). Another embodiment provides an audible signal indicating more precisely the nature of the emergency message of interest. For example, the speaker 612 audibly broadcasts out a message such as "intruder detected at residence" or another suitable audible message. Furthermore, another embodiment is configured to include a microphone (not shown) that is configured to receive audible messages from the user and to broadcast the audible message by the transceiver 604.

Another embodiment employs a light source 614 to notify the user of the personal emergency message transceiver 602 that an emergency message of interest has been received by the emergency message management controller 302 (FIG. 3). For example, the light source 614 could be a light emitting diode (LED), an incandescent light or other light generating device. Other embodiments of the personal emergency message transceiver 602 employ other devices to notify the user that an emergency message of interest has been received. For example, one embodiment employs a vibratory device (not shown) that provides an indication to the user through a vibratory movement of the personal emergency message transceiver 602.

Another embodiment of the personal emergency transceiver 602 employs a display 618. Display 618 is configured to receive emergency messages from the emergency message management controller 302 (FIG. 3) and indicate information associated with the received emergency message. For example, display 618 may use alpha-numeric symbols to indicate the nature and the location of the emergency message. Accordingly, the display 618 may show an emergency message such as "intruder at home" or another suitable message. Furthermore, another embodiment of the personal emergency message transceiver 602 employs the display 618 for indicating general events of interest, such as stock market activity, national emergencies, holidays or the like. The display 618 may be any suitable device for displaying an emergency message. For example, but not limited to, the display 618 may be a flat panel screen, a LED screen, a liquid crystal display (LCD) or any other known screen device.

Another embodiment of the personal emergency message transceiver 602 employing a keypad 610 may be further configured to perform the same functionality of the personal device 214 (FIG. 2) having the keypad 218. Such an embodiment is particularly advantageous when integrating the personal emergency message transceiver 602 into a transceiver network 100 (FIG. 1) that is configured for a multiplicity of purposes.

h. Embodiment of an Emergency Transceiver Detecting 911 Calls

FIG. 1 illustrates an embodiment of another personal emergency message transceiver 124. The personal emergency message transceiver 124 is configured to have similar functionality as a mobile communication device, such as a mobile telephone, radio, pager, cell phone or the like. Thus, the personal emergency message transceiver 124 is capable of providing voice communication services and is configured to generate emergency messages broadcasted by a transceiver (not shown). Another embodiment is configures to employ a separate transceiver for voice communications and a separate transceiver for communication of emergency messages. In yet another embodiment, a mobile communication device may be retrofitted with a transceiver, thereby creating a personal emergency message transceiver 124. Illustrative examples of mobile communication devices include mobile telephones, cellular devices, radios, pagers or the like.

Special purpose keys residing on the personal emergency message transceiver 124 are configured to have similar functionality as the button 608 and/or the keypad 610 of the personal emergency message transceiver 602 (FIG. 6) described above.

When a transceiver (not shown) residing in the personal emergency message transceiver 124 broadcasts an emergency message signal 126, the emergency message signal 126 is received by any of the transceivers of the transceiver network 100, such as transceiver 102f. Accordingly, the emergency message signal 126 is broadcasted by the transceiver 102f (via signal 114f) to the transceiver station 112b, and then to the transceiver station 112c (via signal 118b), and then to the transceiver unit 106 (via signal 118c), and then to the emergency message management controller 302 (FIG. 3). Alternatively, when the personal emergency message transceiver 124 is sufficiently close to the transceiver unit 106 such that the transceiver unit 106 is able to detect the emergency message broadcasted by the personal emergency message transceiver 124, then the transceiver unit 106 directly relays the emergency message to the emergency message management controller 302 (FIG. 3).

In an exemplary embodiment the personal emergency message transceiver 124 can receive emergency messages from the emergency message system control center 300. The emergency messages received at the personal emergency message transceiver 124 can relate to a variety of events, warnings, notifications, security alerts, stimulus, weather, natural disasters, or other information. For example, and not limitation, as discussed above, the emergency message system control center 300 can generate an emergency message regarding a tornado. Additionally, in an exemplary embodiment the emergency message system control center 300 can direct emergency messages to the personal emergency message transceiver 124 based on the location of the personal emergency message transceiver 124. As described above with the respect to an emergency message regarding a tornado, the emergency message system control center 300 can send a message to all devices known to be in the vicinity of the tornado alert region.

As shown in FIG. 1, the personal emergency message transceiver 124 can be a mobile communication device, such as a mobile telephone or cellular device. In an exemplary embodiment, the mobile telephone includes a transceiver, and hardware and software configured to communicate with the emergency message system control center 300. In an exemplary embodiment the personal emergency message transceiver 124 can communicate directly with the emergency message system control center 300 via the cellular network to which the personal emergency message transceiver 124 subscribes. In an alternative embodiment the personal emergency message transceiver 124 can be configured to communicate with a secondary communication device in order to ultimately reach the emergency message system control center 300. For example, and not limitation, as shown in FIG. 1, the personal emergency message transceiver 124 can communicate with a transceiver 102f of the transceiver network 100. Additionally, the personal emergency message transceiver 124 can communicate with a transceiver unit 120 in further communication with a site controller 104. The ability of the personal emergency message transceiver 124 to communicate with the transceivers in the transceiver network 100 extends the coverage area for the personal emergency message transceiver 124 by enabling it rely upon existing transceiver networks 100 to communicate with the emergency message system control center 300. Furthermore, the site controller 104 in an exemplary embodiment can serve as a gateway device to connect the personal emergency message transceiver 124 with the Internet, a Wide Area Network, and/or a Local Area Network. For example, a transceiver unit 120 is illustrated in FIG. 1 coupled to the site controller 104 via connection 122. Transceiver unit 120 is configured to communicate with another transceiver network. Thus, transceiver unit 120 may serve one geographic region and transceiver unit 106 may service a different geographic region. The geographic regions are, in reality, artificial in that any transceiver may communicate with any other transceiver unit so long as its broadcast signal strength is sufficient to be detected by the transceiver unit. Thus, any boundary associated with a geographic reign is easily redefined or changed by simply reconfiguring the defined communication path for a transceiver, as described in greater detail below. Site controller 104 is configured in an exemplary embodiment to communicate with any desired number of transceiver units. Furthermore, a plurality of site controllers can be deployed within a service area, thereby increasing the area of coverage of the transceiver network 100. There are no known limitations that would limit the number of transceivers in communication with the emergency message system control center 300 when a suitable number of transceiver units and site controllers are implemented with a plurality of transceivers to form a transceiver network 100.

Those of skill in the art will appreciate that in addition to the mobile telephone device depicted in FIG. 1, the personal emergency message transceiver 124 can be a variety of different types of communication devices, including a smartphone, such as a Blackberry®, iPhone®, and Android® device, a tablet computer, such as an iPad®, PlayBook™, and a Android® tablet, or a portable computer, such as a laptop, netbook, or other portable electronic device capable of communicating with the personal emergency message transceiver 124. In an exemplary embodiment, the personal emergency message transceiver 124 is implemented in a smartphone, and the transceiver for the personal emergency message transceiver 124 is the transceiver included in the smartphone for voice and data communication with the networks to which the smartphone can communicate, including both cellular networks via cellular base stations and the internet via LAN or WAN data connections.

In the exemplary embodiment of a smartphone based personal emergency message transceiver 124, the smartphone is enabled to download or be configured with an emergency message application, to enable communication with the emergency message system control center 300. The user of the personal emergency message transceiver 124 can configure the emergency message application to send and receive a variety of emergency messages based on the preferences of the user. For example, and not limitation, in an exemplary embodiment the emergency message application can be configured to receive messages regarding potentially hazardous weather or natural disaster related emergencies.

In an exemplary embodiment, the smartphone based personal emergency message transceiver 124 includes a Global Positioning System ("GPS") device enabled to provide information regarding the current location of the smartphone. In this exemplary embodiment, the location information provided by the GPS device can be used by the emergency message application and the emergency message system control center 300 to identify and track the location of the personal emergency message transceiver 124. Those of skill in the art will appreciate that the smartphone based personal emergency message transceiver 124 can alternatively provide other devices and processes for location tracking, including relying upon coupon redemptions by the smartphone based personal emergency message transceiver 124, purchases with the smartphone based personal emergency message transceiver 124, or use of location based social media applications. For example, and not limitation, a user of smartphone based personal emergency message transceiver 124 could use the smartphone to redeem a coupon at a particular coffee shop or use a location based social media application, such as Foursquare™, to identify the current location of the user at the coffee shop and that location could be communicated in real time to the emergency message system control center 300. Subsequently, in an exemplary embodiment, the emergency message system control center 300 can direct emergency messages to be provided to the smartphone based personal emergency message transceiver 124 in accordance with the current location of the user. For example, and not limitation, the coffee shop that the user posted on Foursquare™ could be in an area with a tornado alert and the emergency message system control center 300 could send an emergency message regarding the tornado alert to the smartphone based personal emergency message transceiver 124. Additionally, in an exemplary embodiment the emergency message system control center 300 and/or the emergency message application can be configured to provide certain promotion messages along with or in relation to an emergency message. For example, and not limitation, the emergency message system control center 300 in an exemplary embodiment can provide an emergency message to an emergency message application on a smartphone based personal emergency message transceiver 124 regarding a winter weather advisory in the vicinity of the transceiver 124. Subsequently, in conjunction with that winter weather advisory emergency message, the emergency message system control center 300 could transmit a coupon message to the emergency message application regarding a coupon for firewood at a local hardware store in view of the impeding snow storm. In an other embodiment, a emergency message could be received by the emergency message application of a smartphone based personal emergency message transceiver 124 that indicates a flash food warning has been issued and also providing a coupon for the purchase of materials for sand bags at a local store.

In an exemplary embodiment, the user can configure the emergency message application on the smartphone based personal emergency message transceiver 124 to receive emergency messages regarding hazardous weather and natural disasters in the vicinity of the user. For example, and not limitation, the emergency message system control center 300 obtains information a possible tsunami offshore from the island of Japan. In this non-limiting example, the emergency message system control center 300 maintains a list of all smartphone based personal emergency message transceivers 124 with an active emergency message application that have provided location information from the GPS device on the smartphone that the smartphone is located in Japan. Furthermore, the emergency message system control center 300 is enabled to send an emergency message to all smartphone based personal emergency message transceivers 124 that have configured their emergency message application to receive emergency messages for this geographic region. In this non-limiting example, the user would receive an emergency message via the emergency message application on the smartphone based personal emergency message transceiver 124 indicating that a tsunami had been detected in Japan near the vicinity of the user. As can be readily understood, the ability of a user to receive accurate real time emergency messages based on their current location is extremely beneficial. In the example of a tsunami warning, the user could receive rapid and real time information regarding the tsunami, giving the user the ability to seek refuge in a place or location outside of the danger zone of the tsunami. For many hazardous weather events and natural disasters, immediate and prompt notification to those in danger is absolutely critical in preventing harm and even loss of life. The emergency message system control center 300 can enable emergency messages to be instantly distributed to a large number of personal emergency message transceiver 124. In an exemplary embodiment, the emergency message system control center 300 is enabled to communicated or receive information from a separate weather or information network. For example, and not limitation, the emergency message system control center 300 can receive information from the National Oceanic and Atmospheric Administration network and database, such as readings from an NOAA ocean based buoys or other remote pressure recorder that a tsunami has been detected.

The ability of the emergency message application to provide notifications of emergencies based on the location of the user provides a number of important advantages to the user. Significantly, the user can receive emergency messages from the emergency message system control center 300 based on the location of the user. For example, and not limitation, a user traveling to Japan may not be familiar with tsunamis or even the ability for Japan to experience tsunamis. Regardless, in this non-limiting example, the user could fly to Tokyo, and the personal emergency message transceiver 124 can send an update to the emergency message system control center 300 that the transceiver 124 is currently located in Tokyo, Japasn. Subsequently, the smartphone based personal emergency message transceivers 124 could receive an emergency message from the emergency message system control center 300 alerting the user to a tsunami in the vicinity of the user. Therefore, the user can be made aware by the emergency message application of hazardous weather or natural disasters when traveling from city to city.

The location based feature of the emergency message application provided in accordance with an exemplary embodiment of the present invention can provide another significant advantage in that it can limit the amount of emergency messages received by the user. Those of skill in the art will appreciate that the greater the quantity of the emergency messages delivered to the user via an emergency message application, the less attention that will be paid by a user to any particular emergency message. Therefore, in certain implementations, it is important to notify the user only of those emergencies that warrant the user's attention. In an exemplary embodiment, the emergency message application residing on a smartphone based personal emergency message transceiver 124 can be configured to only alert the user to hazardous weather or natural disasters within a certain radius of the current location of the user. For example, and not limitation, the user can configure the emergency message application to provide notifications regarding tornado warnings within 20 miles of the user. In this example, the user might be traveling in a car and receive an emergency message via the emergency message application that a tornado warning had been issued for the county through which the user is currently traveling through. Once the user has traveled beyond that county, the user would no longer receive an emergency message regarding a tornado warning in that county. Therefore, the location based feature of the emergency message application can significantly limit the number of emergency messages delivered to the user by updating in real time the location of the smartphone based personal emergency message transceiver 124 and only providing emergency messages relevant to the current position of the personal emergency message transceiver 124.

Those of skill in the art will appreciate that the emergency message application of the emergency message system control center 300 can be configured to provide emergency messages according to the preferences and parameters of the user. For example, and not limitation, the emergency message application could be configured to only provide emergency messages regarding earthquakes. In this example, a particular user living in a earthquake prone area may place a high importance on receiving immediate emergency messages from the emergency message system control center 300 regarding the occurrence of an earthquake, but the user may be uninterested in any other types of emergency messages generated by the emergency message system control center 300. In an alternative example, a user may configure the emergency message application to only receive emergency messages regarding traffic issues in a particular region. In this example, the user may have a delivery route in a particular geographic region and only be concerned with receiving emergency messages from the emergency message system control center 300 regarding significant traffic emergencies in the geographic region of interest. In an exemplary embodiment, the emergency message application receives all of the emergency messages broadcast by the emergency message system control center 300, and the emergency message application filters the messages that are to be provided to the user of the personal emergency message transceiver 124. In an alternative embodiment, the emergency message system control center 300 is responsible for filtering the messages and only distributes those emergency messages to a particular personal emergency message transceiver 124 that the emergency message application for that transceiver 124 has been configured to receive.

Not only can the emergency message application be configured to provide the user with control over the types of emergency messages received, the emergency message application can provide the user with control over time parameters for when messages are received. In an exemplary embodiment, the user can configure the emergency message application to provide certain types of emergency messages at certain times of the day. For example, and not limitation, the user can configure the emergency message application to provide emergency messages regarding traffic only during the morning rush hour and afternoon rush hour, emergency messages regarding thunderstorms and tornados only in the evening, and all other types of emergency messages at any time during the day. Additionally, the emergency message application can be configured to receive certain types of emergency messages based upon the location of the user. For example, and not limitation, the emergency message application can be configured to provide emergency messages regarding earthquakes when the smartphone based personal emergency message transceiver 124 is in California, and emergency messages regarding tornadoes when the smartphone based personal emergency message transceiver 124 is in Kansas. Additionally the emergency message application can be configured to provide emergency messages based on seasonal changes, such as providing hurricane alerts during hurricane season.

In an alternative embodiment, the emergency message application can be configured to provide emergency messages without regard to the location of the smartphone based personal emergency message transceiver 124. In accordance with an exemplary embodiment of the present invention, the emergency message system control center 300 can be configured to provide emergency messages and information to the emergency message application on smartphone based personal emergency message transceiver 124 regardless of whether the smartphone has a GPS device capable of providing location based information. More specifically, the emergency message application can be configured to receive emergency messages from the emergency message system control center 300 without providing any information regarding the current location of the user. In this example, the user can configure the emergency message application to provide emergency messages based upon a selected city, state, zip code, or other geographic parameter. Furthermore, the user can select more than one city or geographic area from which to receive emergency messages. For example, and not limitation, a user residing in Washington D.C. with family in San Francisco can select to receive emergency message information from the emergency message system control center 300 related to both Washington, D.C. and San Francisco. Therefore, a user of the emergency message application can stay informed about emergencies in both their home city and also the city where family members reside.

In addition to setting parameters in the emergency message application regarding location and time of day, an exemplary embodiment of the emergency message application can be configured to provide certain types or levels of emergencies. In an exemplary embodiment, the emergency message system control center 300 assigns a level of priority to each emergency message. Therefore, in this exemplary embodiment, the user can configure the emergency message application to provide notification of only the highest level emergencies or perhaps both the moderate and high level emergencies.

Another embodiment of the transceivers residing in the transceiver network 100 are configured to detect emergency 911 calls from mobile communication devices, such as a mobile telephone, radio, pager, cell phone or the like. Such mobile communication devices include with the voice communications other information that identifies the mobile communication device. For example, some mobile communication devices employ an upper channel of the RF signal for communication of the other information. Another embodiment employs header information or the like in a digital communication signal. Such information is typically used for the determination of telephone related services, such as long distance telephone charges. When a person has subscribed to a service that employs the transceiver network 100 for the detection of emergency messages, the transceivers within the transceiver network are configured to recognize that the emergency 911 call is generated by a subscribing customer. Accordingly, the emergency 911 call is recognized as an emergency message and is subsequently relayed onto the energy message management controller 302 (FIG. 3) as described above. This embodiment is particularly advantageous in that the emergency message management controller 302 may provide additional services and/or provide additional information to interested parties.

The above-described embodiments of the transceivers configured to detect emergency 911 calls are particularly advantageous in determining the location of the device generating the emergency 911 call. For example, a person or small child making a 911 call may not be able to indicate location for any number of reasons. Accordingly, transceivers detecting the emergency 911 call generate an emergency message that includes the identification code of the detecting transceiver. When the emergency message is relayed to the emergency message management controller 302 (FIG. 3), the location of the transmitting transceiver is precisely known since location information of the transceiver, included in database 314 (FIG. 3), is associated with the identification code contained in the received emergency message. Accordingly, the emergency message management controller 302, based upon the known location of the transceiver detecting the emergency 911 call, may closely approximate the location of the device generating the emergency 911 calls. Furthermore, if multiple transceivers in the transceiver network 100 detect the broadcasted emergency 911 call, the emergency message management controller logic 316 executes a position determination algorithm to triangulate more precisely the location of the device generating the emergency 911 call.

Furthermore, the emergency message management controller 302 may be configured to notify other interested parties that an emergency 911 phone call has been detected. Accordingly, the emergency message management controller 302 is configured to provide a message to the control room operators 304 with instructions to manually call another interested party. For example, the control room operators 304 may be directed to call the mother when the husband or a child using a mobile communication device makes an emergency 911 call. As another example, the control room operators 304 may be directed to call a family physician, attorney, employer or the like when an emergency 911 call is detected. Another embodiment of the transceivers residing in the transceiver network 100 are configured to detect the actual voice message associated with the 911 emergency call and relay the voice communications from the mobile communication device to the control room operators 304, via the emergency message management controller 302, as described above. Accordingly, the control room operators provide additional information to the called third party such as the approximate location of the mobile communication device and the nature of the emergency.

Additionally, the energy message management controller 302, upon receiving an emergency message associated with a detected emergency 911 call, is configured to look up in the database 314 (FIG. 3) personal information associated with a person who may have made the emergency 911 call. Accordingly, the emergency message management controller 302 provides instructions to the control room operators to call the summoned emergency service providers so that additional information may be provided. For example, database 314 may have information indicating that the person(s) may be subject to an allergic reaction to particular substances. The emergency message management controller 302 instructs the control room operators 304 to call the person receiving the actual emergency 911 call, or other interested emergency service providers such as the ambulance technicians or a doctor, to provide information regarding the possible allergic reactions of the customer.

i. Operation of the Emergency Message Management Controller

Figure 7:
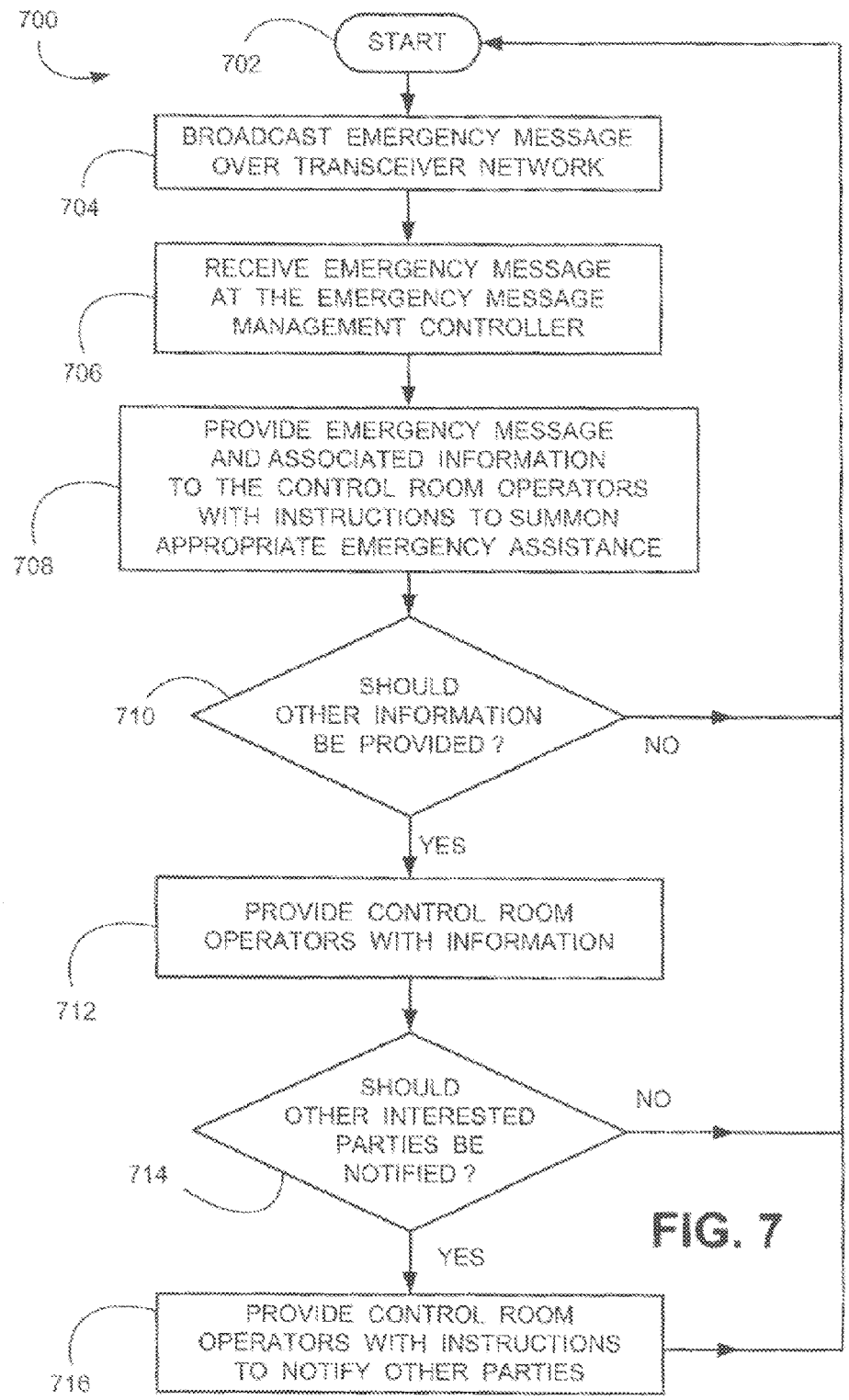
FIG. 7 is a flow chart 700 illustrating a process for communicating an emergency message generated by one of the transceivers of FIGS. 1-2 and 4-6.

FIG. 7 is a flow chart 700 illustrating a process for communicating an emergency message generated by one of the transceivers of FIGS. 1-2 and 4-6. The flow chart 700 shows the architecture, functionality, and operation of a possible implementation of the software associated with the emergency message management controller logic 316 (FIG. 3). In this regard, each block may represent a module, segment, or portion of code, which comprises one or more executable instructions for implementing the specified logical function(s). It should also be noted that in some alternative implementations, the functions noted in the blocks may occur out of the order noted in FIG. 7, or may include additional functions, without departing significantly from the functionality of the process of the emergency message management controller 702. For example, two blocks shown in succession in FIG. 7 may in fact be executed substantially concurrently, the blocks may sometimes be executed in the reverse order, or some of the blocks may not be executed in all instances, depending upon the functionality involved, as will be further clarified herein below. All such modifications and variations are intended to be included herein within the scope of this disclosure and to be protected by the accompanying claims.

When the emergency message management controller logic 316 is implemented as software and stored in memory 310 (FIG. 3), the emergency message management controller logic 316 can be stored on any computer readable medium for use by or in connection with any computer and/or processor related system or method. In the context of this document, a memory 310 is a computer readable medium that is an electronic, magnetic, optical, or other another physical device or means that contains or stores a computer and/or processor program. The emergency message management controller logic 316 can be embodied in any computer readable medium for use by or in connection with an instruction execution system, apparatus, or device, such as a computer-based system, processor-containing system, or other system that can fetch the instructions from the instruction execution system, apparatus, or device and execute the instructions associated with the emergency message management controller logic 316. In the context of this specification, a "computer readable medium" can be any means that can store, communicate, propagate, or transport the program associated with the emergency message management controller logic 316 for use by or in connection with the instruction execution system, apparatus, and/or device. The computer readable medium can be, for example, but not limited to, an electronic, magnetic, optical, electromagnetic, infrared, or semiconductor system, apparatus, device, or propagation medium. More specific examples (a nonexhaustive list) of the computer readable medium would include the following: an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium, could even be paper or another suitable medium upon which the program associated with the emergency message management controller logic 316 is printed, as the program can be electronically captured, via for instance optical scanning of the paper or other medium, then compiled, interpreted or otherwise processed in a suitable manner if necessary, and then stored in memory 310 or in another suitable memory.

The process starts at block 702 when an emergency situation arises. At block 704, a transceiver is actuated in response to the emergency such that an emergency message is broadcasted over the transceiver network 100 (FIG. 1). At block 706, the emergency message is received at the emergency message management controller 302 (FIG. 3) in a manner described above. At block 708, the emergency message management controller 302 executes the emergency message management controller logic 316. Accordingly, a suitably formatted emergency message is provided to the control room operators 304 (FIG. 3) that includes information of interest such that the control room operators summon the appropriate emergency assistance.

At block 710, a determination is made whether or not other information should be provided. If no other information is provided at block 710 (the NO condition), the process returns to block 702. If other information should be provided to the control room operators 304 (the YES condition), the other information is provided to the control room operators 304 at block 712. As described above, such information may include, but is not limited to, the identification code of each the transceivers, the location of the transceiver, and the nature of the emergency situation.

At block 714, a determination is made whether or not other interested parties should be notified. If no other interested parties are to be notified at block 710 (the NO condition), the process returns to block 702. If other information should be provided to the control room operators 304 (the YES condition), the other information is provided to the control room operators 304 at block 716. For example, the emergency message management controller logic 316 may determine that a spouse, other relative, employer or other individual(s) identified in the database 314 should be notified of the received emergency message. The process then returns to block 702 to await the next emergency situation.

j. Transceiver Maintenance Feature

One embodiment described above employs transceivers configured to transmit emergency messages back to the emergency message management controller 302 (FIG. 3). Each transceiver includes its unique identification code as part of the broadcasted emergency message. Location information for each transceiver, identified in database 314 (FIG. 3), is determined by associating the identification code in the received emergency message with the corresponding location information (identified by the corresponding identification code). Transceivers transmitting information back to the emergency message management controller 302, in one embodiment, are configured to include logic that indicates the operational status of the monitoring device and/or its associated components back to the emergency message management controller 302. The emergency message management controller logic 316 (FIG. 3) includes a transceiver maintenance function that evaluates received status and information from the signals transmitted by the transceivers such that the operational integrity of the monitoring device is accessed. That is, if a component in the monitoring device fails, the status information indicates failure of that component. The emergency message management controller logic 316 provides the appropriate indication to the control room operators 304 such that maintenance personnel are dispatched out to the monitoring device to effect a repair of the non-functioning or improperly functioning component.

One embodiment employing the above-described maintenance feature employs transceivers configured to periodically transmit status information to the emergency message management controller 302 at predefined time intervals. Another embodiment employs transceivers configured to respond to a status information request generated by the emergency message management controller 302. Here, logic residing in the emergency message management controller logic 316 performs a maintenance function wherein pre-selected transceivers are requested to provide status information. Another embodiment employs transceivers configured to generate periodic status reports to the emergency message management controller 302 and are configured to respond to requests for status information from the Emergency message management controller 302. In yet another embodiment, all three types of the above-described transceivers are employed to communicate status information to the emergency message management controller 302.

When the transceiver components that broadcast the status information fails, such as, but not limited to, the transceiver itself, the failure is detected by a loss of signal. Thus, in an embodiment employing a transceiver that is to provide an acknowledgement signal, or provide a status signal in response to a status information request, or is to provide periodic status information reports, the failure of the transceiver to respond or provide information at scheduled times and/or is response to a status inquiry indicates a component failure.

Summarizing, the above-described embodiment includes a maintenance functionality such that the operational status of the transceivers residing in the transceiver network 100 (FIG. 1) and/or monitoring devices are monitored to ensure continuous operational functionality. Other components of the above-described communication network, such as the detectors and/or their components, may be also monitored. Thus, a detected failure in a transceiver, transceiver component, detector and/or a detector component may be quickly detected such that maintenance personnel are dispatched to repair the failed transceiver, detector or components. This embodiment is particularly advantageous in providing an emergency message system having a high degree of operational reliability and integrity.

k. Defining Transceiver Communication Paths

For convenience describing the operation and functionality of the transceiver network 100 (FIG. 1), a simplified description of the communication paths employed by the plurality of transceivers is described above. In one embodiment, all transceivers employed in the transceiver network have both capability to receive broadcasted signals and to broadcast signals. However, many of the transceivers have a limited transmit signal range as the strength of the broadcasted signal is relatively low. This embodiment is particularly suited in transceiver network 100 configurations employing a large number of transceivers located in close proximity to other transceivers.

In one embodiment, the communication path that a transceiver employs for broadcasting signals is predefined. For example, transceiver 102a in FIG. 1 was described above as transmitting emergency messages to transceiver unit 106 over the path defined by signals 114a, 118a and 118c. That is, when the transceiver unit 106 receives an emergency message from transceiver 102a, transceiver stations 112a and 112c are configured to relay the signal to the transceiver unit 106. Here, if the transceiver station 112c detects the emergency message from transceiver 102a, transceiver station 112c simply ignores the detected emergency message and does not relay the emergency message.

In one embodiment, transmission paths for all transceivers are predetermined by the emergency message management controller 302 (FIG. 3). Path information is broadcasted out to all components of the transceiver network 100, transceiver stations, transceiver units and site controllers. This information is stored in a memory residing in or coupled to each of the components of the transceiver network 100, transceiver stations, transceiver units and site controllers. Each component then configures itself to react only to those signals for which it is part of the predefined path. Thus, when the transceiver unit 102b detects an emergency message from transceiver 102a, transceiver units 102b recognizes that it is not part of the path to transceiver 102a, and simply takes no action.

In one embodiment, the communication paths are defined by using the identification codes associated with each transceiver, and identification codes assigned to the transceiver stations, transceiver units and site controllers. For example, if site controller 104 is defined by the identification code "104", transceiver unit 106 is defined by the identification code "106", transceiver station 112c is defined by the identification code "112c", transceiver station 112a is defined by the identification code "112a", and transceiver 102a is defined by the identification code "102a", the path between the site controller 104 and transceiver 102a is simply defined by a code such as 104.106.112c.112a.102a (where each number corresponds to the component identification code). Other suitable codes are easily defined.

Such a system is described in detail in the commonly assigned patent entitled "MULTI-FUNCTION GENERAL PURPOSE TRANSCEIVER," filed Mar. 18, 1999, and accorded U.S. Pat. No. 6,233,327B1, issued on May 15, 2001 and incorporated herein by reference in its entirety.

In one embodiment of the emergency message system, failure of a transceiver or a transceiver component is detected in a manner described above. When such a failure is detected, communications with other transceivers may be disrupted if the failed transceiver or transceiver component is in the communication path of other transceivers. In such a situation, upon the detection of the failed transceiver or transceiver component, the emergency message management controller 302 (FIG. 3) redefines communication paths for affected transceivers, and transmits the redefined paths out to the transceivers, transceiver stations, transceiver units and site controllers such that the paths are redefined. For example, transceiver station 112a (FIG. 1) may fail. Thus, transceivers 102a, 102b and 102c (FIG. 1) will not be in communication with the emergency message management controller 302 (FIG. 3). The communication path for transceiver 102c would then be redefined such that transceiver 102c is communicating with transceiver 102d (assuming that transceiver 102d is sufficiently close to transceiver 102c to detect signals broadcasted from transceiver 102c). Thus, transceiver 102c is in communication with the transceiver unit 106 (FIG. 1) through a newly defined path indicated by the signals 128a, 114d, 118b and 118c (FIG. 1). Here, transceiver 102d is operating as both an emergency message transceiver (when communicating emergency messages from the customer premises 103d) and a network transceiver (when communicating emergency messages from other transceivers).

Similarly, the communication path for transceiver 102b is then redefined such that transceiver 102b is communicating with transceiver 102c (assuming that transceiver 102c is sufficiently close to transceiver 102b to detect signals broadcasted from transceiver 102b). Thus, transceiver 102b would be in communication with the transceiver unit 106 through a newly defined path indicated by the signals 128b, 128a, 114d, 118b and 118c (FIG. 1). Here, transceivers 102c and 102d are operating as both an emergency message transceiver (when communicating emergency messages from the customer premises 103c and 103d, respectively) and a network transceiver (when communicating emergency messages from other transceivers).

Similarly, the communication path for transceiver 102a is then redefined such that transceiver 102a is communicating with transceiver 102b (assuming that transceiver 102b is sufficiently close to transceiver 102a to detect signals broadcasted from transceiver 102a). Thus, transceiver 102a would be in communication with the transceiver unit 106 through a newly defined path indicated by the signals 128c, 128b, 128a, 114d, 118b and 118c (FIG. 1). Here, transceivers 102b, 102c and 102d are operating as both an emergency message transceiver (when communicating emergency messages from the customer premises 103b, 103c and 103d, respectively) and a network transceiver (when communicating emergency messages from other transceivers).

One skilled in the art will appreciate that the possible communication paths in a transceiver network 100 are nearly limitless, and that such communication paths are easily redefined by the emergency message management controller 302. The above described examples are intended to illustrate some of the alternative redefined communication paths to explain the operation and functionality of the maintenance feature of one embodiment of the emergency message communication system.

1. Alternative Embodiments of the Emergency Message Communication System

For convenience of describing the operation and functionality of the emergency message management controller 302 (FIG. 3), the emergency message management controller 302 was illustrated as a stand-alone unit. The emergency message management controller 302, in an alternative embodiment, is implemented as an integral component of another system, such as, but not limited to, a security monitoring system, without departing substantially from the operation and functionality of the emergency message system.

Furthermore, the components illustrated as residing in the emergency message management controller 302 may reside in alternative convenient locations outside of the emergency message management controller 302 without adversely affecting the operation and functionality of the emergency message system. Such components may even be integrated with other existing components residing in the emergency message system control center, thereby minimizing the cost of implementing an emergency message system.

For example, the database 314 residing in the memory 310 (FIG. 3) may be implemented in a memory unit residing in an alternative location, such as the control console 322. Thus, information provided used the emergency message system could simply be transferred to a database residing in the alternative location.

Similarly, the emergency message management controller logic 316 (FIG. 3) could reside in a convenient alternative location and be executed by a different processor that resides in a convenient alternative location. Also, the interface 312 may be implemented as a stand-alone interface unit residing in a convenient location. For example, interface 312 may be implemented as a stand-alone PC, a network PC, a dedicated intra-network interface or the like that performs the functionality of receiving information through a communication network from the site controller 104 (FIGS. 1 and 2).

For convenience of describing the operation and functionality of the emergency message management controller 302 (FIG. 3), the emergency message management controller 302 was illustrated as a stand-alone unit residing within the emergency message system control center 300. Another embodiment of the emergency message management controller resides in an alternative convenient location outside of the emergency message system control center 300. In such an embodiment, connection 324 may be a connection of suitable length to provide connectivity between processor 308 and the control console 322. In other embodiments, connection 324 may include a plurality of components that provides connectivity over a special purpose network or an existing, general purpose network. For example the emergency message management controller 302 could be in communication with the emergency message system over any one of the communication systems described above and illustrated in FIG. 4. Such a configuration is easily implemented using appropriate interface components. Such interface components residing in an emergency message management controller that are configured to transmit, receive and convert signals are known in the art and, therefore, are not described in detail herein other than to the extent necessary to understand the operation and functioning of these components when employed as part of the emergency message system that is remote from the emergency message system control center 300. One skilled in the art will realize that such known components are too numerous to describe in detail herein, and that any configuration of such known components having the above-described functionality may be implemented without departing substantially from the emergency message system.

The embodiment of the emergency message system was described herein to include a plurality of transceiver units configured to communicate based upon a predefined communication path specified by the emergency message management controller 302. An alternative embodiment is configured to communicate with other special purpose systems that employ compatible transceivers. For example, a system for monitoring emergency, alarm, climate, or other conditions in a defined territory is disclosed in the co-pending commonly assigned non-provisional application entitled "SYSTEM FOR MONITORING CONDITIONS IN A RESIDENTIAL LIVING COMMUNITY," filed Mar. 18, 1999, and accorded Ser. No. 09/271,517, incorporated herein by reference in its entirety. Another system for controlling electricity demand in a defined territory is disclosed in the co-pending commonly assigned non-provisional application entitled "SYSTEM AND METHOD FOR CONTROLLING POWER DEMAND OVER AN INTEGRATED WIRELESS NETWORK," filed Aug. 15, 2001, and accorded Ser. No. 09/929,926, incorporated herein by reference in its entirety. The above applications describe a computerized system for monitoring power and/or other conditions in a defined territory using a network of transceivers communicating back to a remote facility via a plurality of repeaters and a central system (such as a site controller). The plurality of transceivers configured for monitoring power and/or other conditions in a defined territory are integrated with a plurality of transceivers for controlling customer premises appliances, thereby reducing overall facility, maintenance and installation costs by employing common units. For example, a transceiver controlling an air conditioning unit or a transceiver monitoring metered demand (in accordance with the Ser. No. 09/929,926 application) may be integrated to communicate through same transceiver stations, transceiver units and/or site controllers communication emergency messages. The integrated system would simply recognize the transceiver communicating an emergency message and appropriately route communications to and/or from that transceiver to the appropriate remote facility. One skilled in the art will appreciate that an emergency message communication system described herein is interpretable into any other special purpose system or a multipurpose system based upon a network of similarly configured transceivers that communicate through common components.

Another embodiment of the emergency message system is configured to give communicated emergency messages the highest priority with respect to other communications. For example, but not limited to, an emergency message system may be integrated with another system employing a transceiver network, as described above. The transceiver network would then have a multiplicity of functions, one of which is the communication of emergency messages. If other communications are being communicated across the network, such communications will utilize available bandwidth of the network. When the bandwidth of the network is substantially utilized, such as when large amounts of data are being communicated, an emergency message can be designated, tagged, or otherwise identified as having a high priority. Network transceivers, upon receiving an emergency message identified with a high priority would stop, halt, delay the communication of other messages and/or otherwise make available bandwidth such that emergency message is communicated on a priority basis. Such an embodiment is advantageous when a transceiver network is utilized for a plurality of functions and in ensuring that emergency messages are communicated as quickly as possible.

Another embodiment employs a power line carrier (PLC) signal to communicate signals from detectors such that a receiving transceiver generates emergency messages into an emergency message system. For example, but not limited to, smoke detector 204a (FIG. 1), in one embodiment, is supplied power via wire 224 which is coupled to the electric distribution network (not shown) within the customer premises 200. Rather than being coupled to the transceiver 202a, the smoke detector communicates signals to the transceiver 226 using PLC signals.

Transceiver 226 is coupled to the electric distribution network at a suitable location. For convenience of illustration, transceiver 226 is illustrated as being coupled to the electrical outlet 228. One embodiment employs a standard outlet spade-type connector (not shown) to couple the transceiver 226 to the electric distribution network. Another embodiment of the transceiver 226 is coupled to the outlet 228 with wire connections coupled at suitable connection points. Other embodiments of the transceiver 226 is coupled to another suitable location on the electric distribution network such that the transceiver 226 is able to reliably receive signals from the smoke detector 204a.

Thus, when the smoke detector 204a detects smoke, a PLC signal is communicated form the smoke detector 204a to the transceiver 226 over the electric distribution network. Upon receiving a PLC signal form the smoke detector 204a, the transceiver 226 generates and communicates an emergency signal in any one of the previously described manners. The communication of PLC signals, and the equipment that generates PLC signals, is known in the art, and is therefore not described in further detail other than to the extent necessary to understand the communication of PLC signals to a transceiver employed as part of an emergency signal system.

Other detectors coupled to the electric distribution network may also be configured to generate PLC signals that are communicated to transceiver 226. Such an embodiment of an integrated security system employing detectors communicating to transceiver 226 with PLC signals is particularly advantageous when it is desirable to limit the number of transceivers employed in the emergency message system.

Another embodiment of the always-on appliance is configured to communicate with at least one transceiver using PLC signals. For example, but not limited to, the cable TV set box 504 (FIG. 5) is coupled to the electric distribution network (not shown). Rather than coupling the cable TV set box 504 to the transceiver 502, as illustrated in FIG. 5, the cable TV set box 504 is configured to communicate emergency messages using a PLC signal to a transceiver (not shown) coupled to the electric distribution network. Furthermore, any of the above describe always-on appliances can be configured to communicate emergence messages with transceivers using PLC signals.

Figure 8:
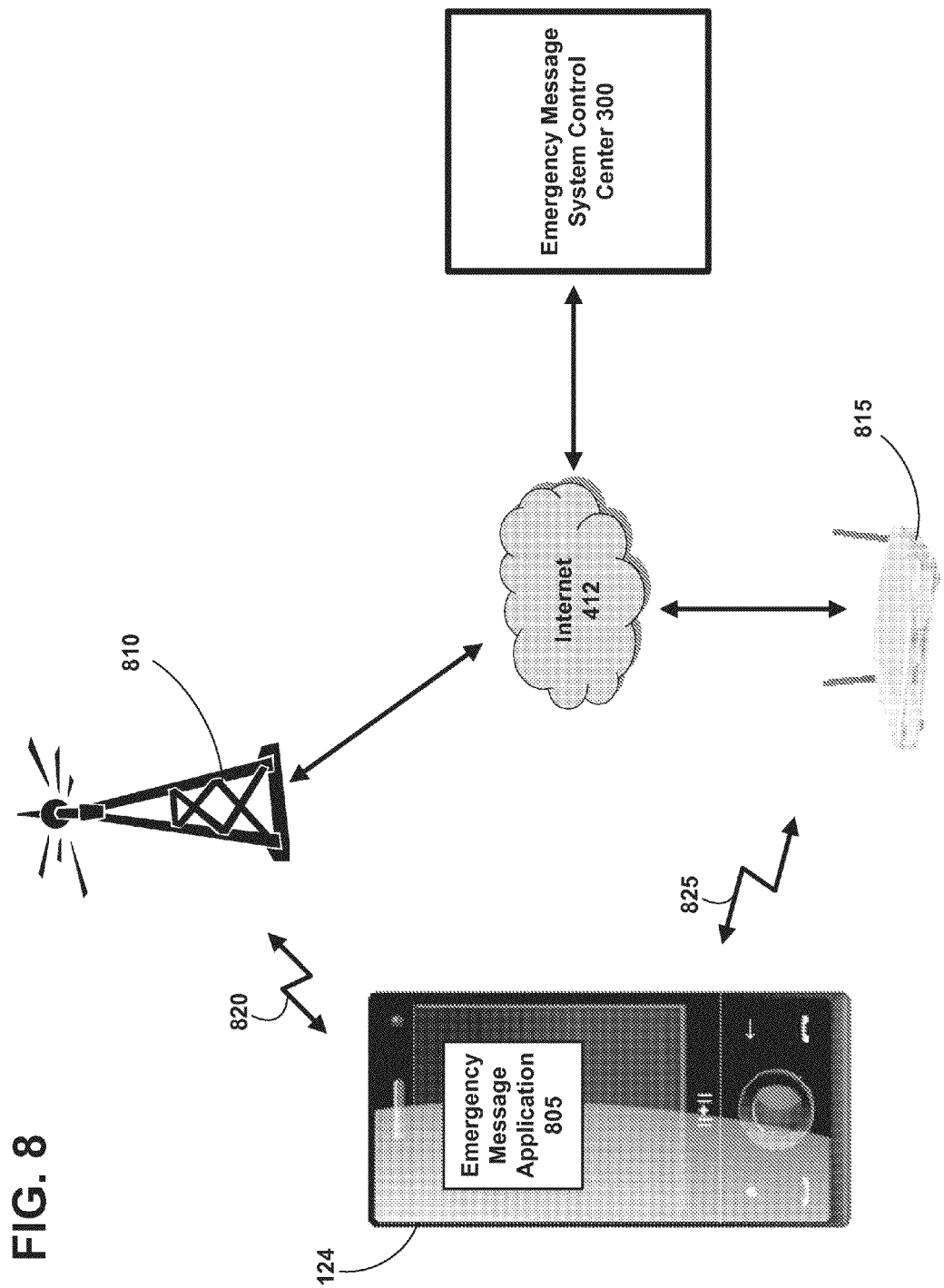
FIG. 8 is a diagram of an exemplary embodiment of a smartphone based personal emergency message transceiver 124 in communication with the emergency message system control center 300 in accordance with an exemplary embodiment of the present invention.

FIG. 8 is a diagram of an exemplary embodiment of a smartphone based personal emergency message transceiver 124 in communication with the emergency message system control center 300 in accordance with an exemplary embodiment of the present invention. As shown in FIG. 8, the personal emergency message transceiver 124 is a smartphone and can be configured with an emergency message application 805. In an exemplary embodiment, the emergency message application 805 is software application that runs on the smartphone. The network architecture shown in the exemplary embodiment in FIG. 10 enables the smartphone based personal emergency message transceiver 124 to communicate with the emergency message system control center 300. In the exemplary embodiment shown in FIG. 8, the smartphone based personal emergency message transceiver 124 can utilize two primary communication links to the emergency message system control center 300.

First, the smartphone based personal emergency message transceiver 124 can utilize the cellular link 820 to connect to a cellular base station 810, as shown in FIG. 8. Those of skill in the art will appreciate that the cellular base station 810 can enable connection to a variety of different networks connected to the cellular communication network, including the Internet 412. Once connected to the Internet 412, data traffic from the smartphone based personal emergency message transceiver 124 can be transmitted to the emergency message system control center 300. Therefore, in this exemplary embodiment the smartphone based personal emergency message transceiver 124 is enabled to exchange data related to the emergency message application 805 via the standard cellular communication path of the smartphone.

Second, as shown in FIG. 8, the smartphone based personal emergency message transceiver 124 can also utilize the data link 825 to connect to a wireless router 815. Those of skill in the art will appreciate that the wireless router 815 can enable connection to the Internet 412. The wireless router 815 can be any type of router with Internet connectivity, such as a wireless router operating on one of the IEEE 802 family of standards, including 802.11 wireless LAN, 802.14 cable modems, 802.15 wireless PAN, 802.15.1 bluetooth, 802.15.4 ZigBee, and 802.16 Broadband Wireless Access WiMAX. Once connected to the Internet 412, data traffic from the smartphone based personal emergency message transceiver 124 can be transmitted and received with the emergency message system control center 300. In accordance with an exemplary embodiment of the present invention, the user of the smartphone based personal emergency message transceiver 124 can be enabled to communicate with the emergency message system control center 300 via either the cellular link 820 or the data link 825 in accordance with the preference of the user.

In an exemplary embodiment, the smartphone based personal emergency message transceiver 124 can be in active communication with the emergency message system control center 300 via the cellular link 820. Accordingly, the emergency message system control center 300 can broadcast emergency messages to the emergency message application 805 on the smartphone based personal emergency message transceiver 124 via the cellular link 820. In an exemplary embodiment, the emergency message application 805 performs the function of determining whether a particular emergency message matches the parameters configured by the user for desired emergency messages. Thus, in this implementation, the emergency message system control center 300 transmits all emergency messages to the smartphone based personal emergency message transceiver 124 and the emergency message application 805 filters those messages. In an alternative embodiment, the emergency message application 805 is configured to transmit the user's preferences to the emergency message system control center 300 and the emergency message system control center 300 only transmits those emergency messages to the smartphone based personal emergency message transceiver 124 that match the user's configuration parameters for emergency messages.

Figure 9:
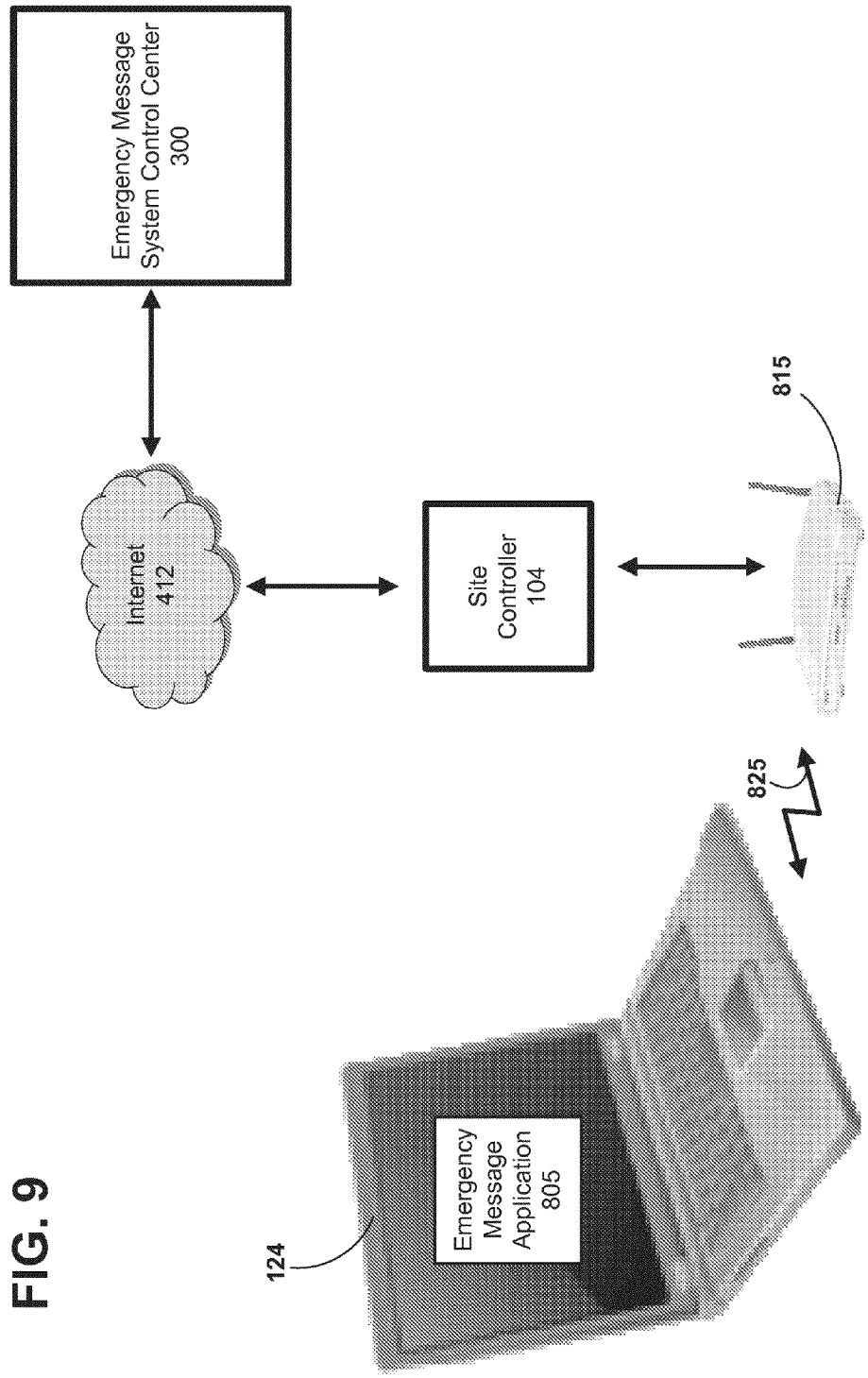
FIG. 9 is a diagram of an exemplary embodiment of a laptop based personal emergency message transceiver 124 in communication with the emergency message system control center 300 in accordance with an exemplary embodiment of the present invention.

FIG. 9 is a diagram of an exemplary embodiment of a laptop based personal emergency message transceiver 124 in communication with the emergency message system control center 300 in accordance with an exemplary embodiment of the present invention. As shown in FIG. 9, the personal emergency message transceiver 124 is a laptop including a wireless communication device and an emergency message application 805. In an exemplary embodiment, the emergency message application 805 is a software application that runs on the laptop. The network architecture shown in the exemplary embodiment in FIG. 1 enables the laptop based personal emergency message transceiver 124 to communicate with the emergency message system control center 300.

As described above, various embodiments of the personal emergency message transceiver 124 can communicate directly with the emergency message system control center 300 or through an intermediate communication unit. The laptop based personal emergency message transceiver 124 is enabled to communicate with site controller 104 through the data link 825 to connect to a wireless router 815. In an exemplary embodiment, the site controller 104 can aggregate, control, and maintain emergency message communication from a variety of personal emergency message transceivers 124. Once connected to the site controller 104, data traffic from the laptop based personal emergency message transceiver 124 can be transmitted to the emergency message system control center 300 via the Internet 412. In accordance with an exemplary embodiment of the present invention, the user of the smartphone based personal emergency message transceiver 124 can be enabled to communicate with the emergency message system control center 300 via either the cellular link 820 or the data link 825 in accordance with the preference of the user.

Figure 10:
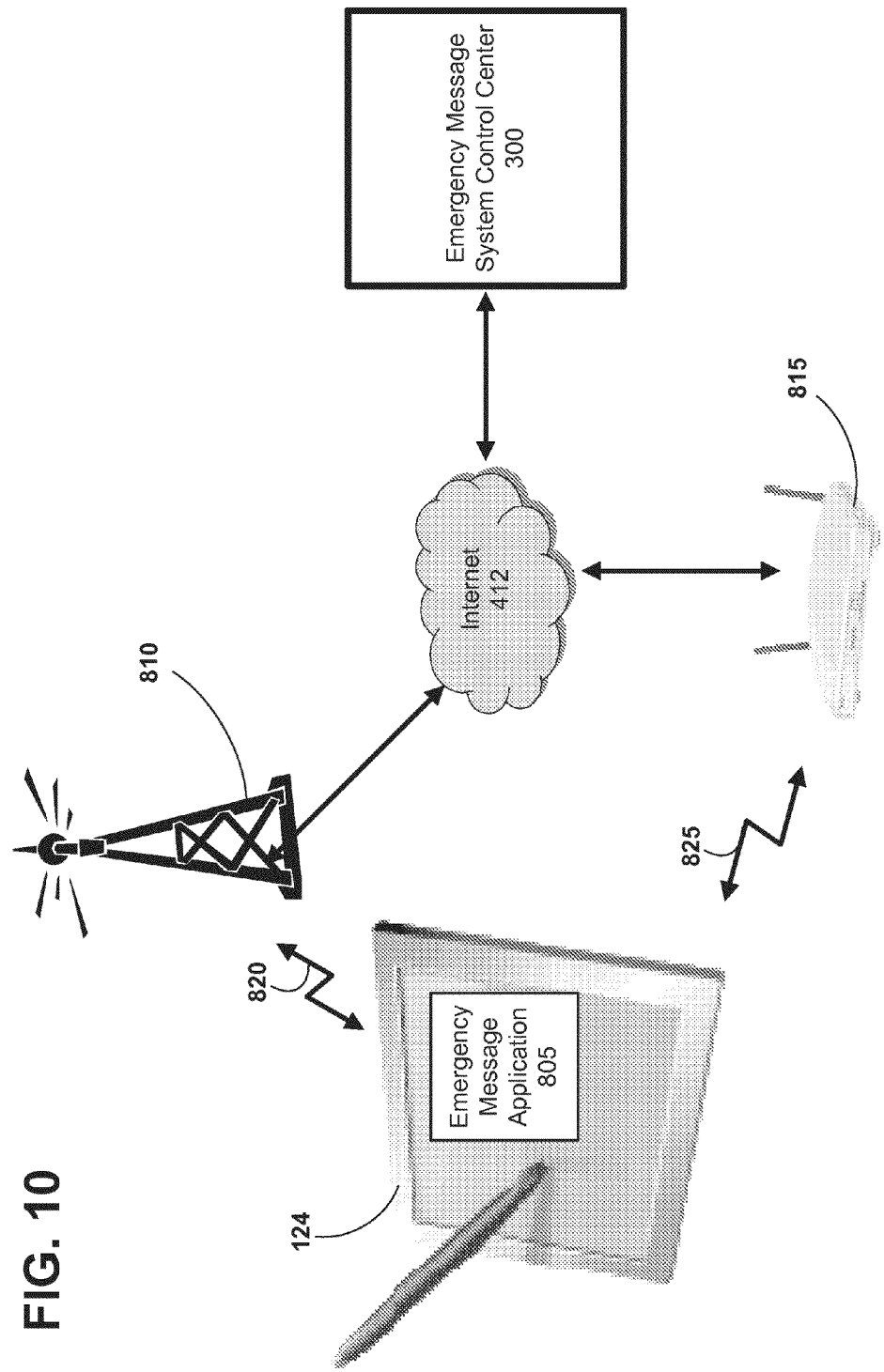
FIG. 10 is a diagram of an exemplary embodiment of a tablet based personal emergency message transceiver 124 in communication with the emergency message system control center 300 in accordance with an exemplary embodiment of the present invention.

FIG. 10 is a diagram of an exemplary embodiment of a tablet based personal emergency message transceiver 124 in communication with the emergency message system control center 300 in accordance with an exemplary embodiment of the present invention. As shown in FIG. 10, the personal emergency message transceiver 124 is a tablet and can be configured with an emergency message application 805. In an exemplary embodiment, the emergency message application 805 is a software application that runs on the tablet. The network architecture shown in the exemplary embodiment in FIG. 10 enables the tablet based personal emergency message transceiver 124 to communicate with the emergency message system control center 300. In the exemplary embodiment shown in FIG. 10, the tablet based personal emergency message transceiver 124 can utilize two primary communication links to the emergency message system control center 300.

First, the tablet based personal emergency message transceiver 124 can utilize the cellular link 820 to connect to a cellular base station 810, as shown in FIG. 10. Those of skill in the art will appreciate that the cellular base station 810 can enable connection to a variety of different networks, including the Internet 412. Once connected to the Internet 412, data traffic from the tablet based personal emergency message transceiver 124 can be transmitted and received with the emergency message system control center 300.

Second, as shown in FIG. 10, the tablet based personal emergency message transceiver 124 can also utilize the data link 825 to connect to a wireless router 815. Those of skill in the art will appreciate that the wireless router 815 can enable connection to the Internet 412. Once connected to the Internet 412, data traffic from the tablet based personal emergency message transceiver 124 can be transmitted to the emergency message system control center 300. In accordance with an exemplary embodiment of the present invention, the user of the tablet based personal emergency message transceiver 124 can be enabled to communicate with the emergency message system control center 300 via either the cellular link 820 or the data link 825 in accordance with the preference of the user.

Figure 11:
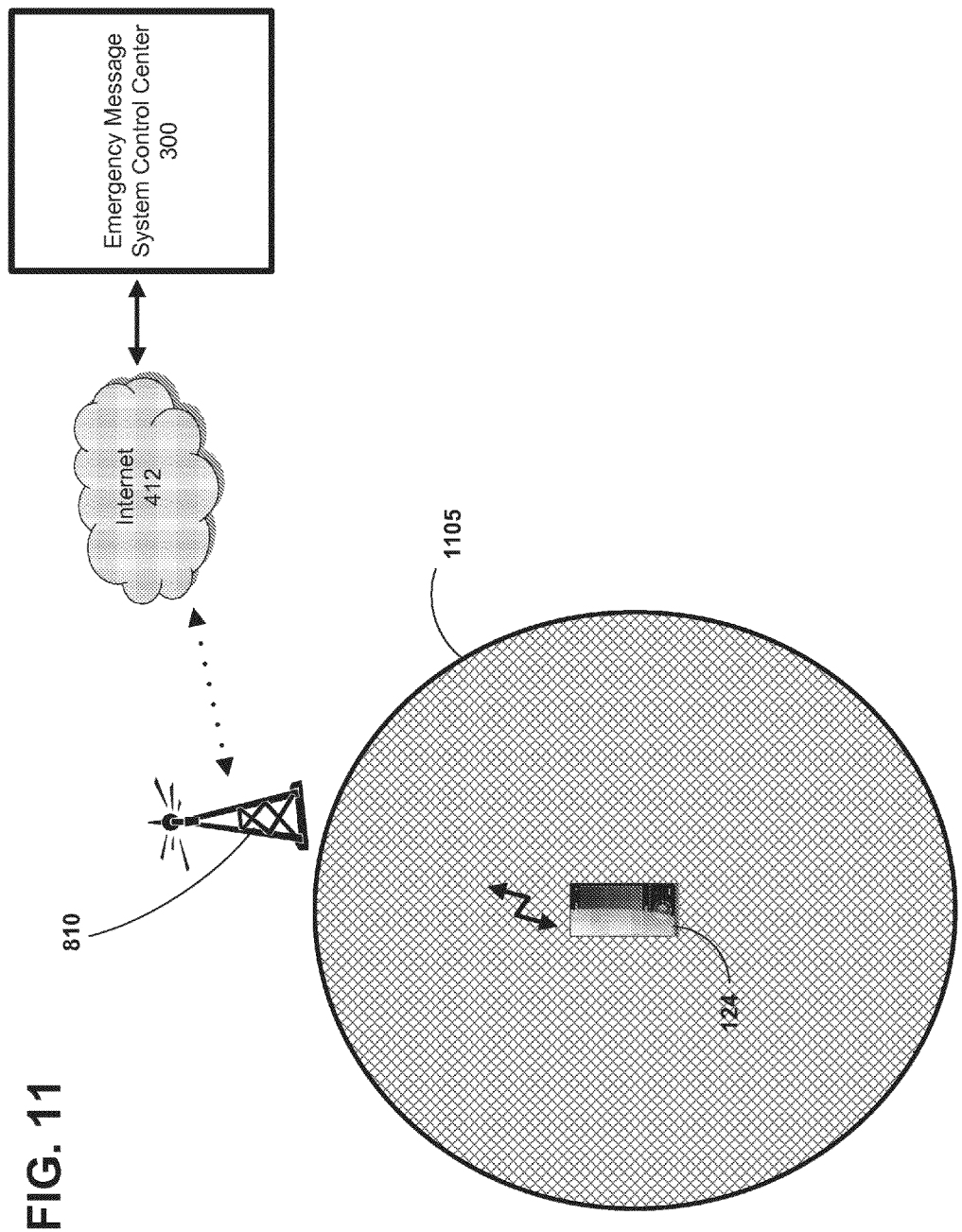
FIG. 11 is a diagram of an exemplary embodiment of a smartphone based personal emergency message transceiver 124 in communication with the emergency message system control center 300 in accordance with an exemplary embodiment of the present invention.

FIG. 11 is a diagram of an exemplary embodiment of a smartphone based personal emergency message transceiver 124 in communication with the emergency message system control center 300 in accordance with an exemplary embodiment of the present invention. In an exemplary embodiment, the emergency message application residing on a smartphone based personal emergency message transceiver 124 can be configured to only alert the user to hazardous weather or natural disasters within a certain radius of the current location of the user. In an exemplary embodiment, the emergency message application 805 can be configured to designate a emergency notification radius 1105, shown in FIG. 11, within a predetermined area around the user's smartphone based personal emergency message transceiver 124 for which to receive emergency messages. In an exemplary embodiment, the emergency message system control center 300 will provide emergency messages to the smartphone based personal emergency message transceiver 124 that are relevant to the emergency notification radius 1105. In this example, the user might be traveling in a car and receive an emergency message via the emergency message application of a tornado warning inside the emergency notification radius 1105. The emergency message application is enabled to send GPS location information to the emergency message system control center 300 to provide a real time update as to the current location of the smartphone based personal emergency message transceiver 124. Therefore, the emergency message system control center 300 can provide accurate and real time emergency messages relevant to only the emergency notification radius 1105 of the user.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A system for communicating emergency messages, the system comprising:
a mobile device comprising an emergency message application and a personal emergency message transceiver,
an emergency message control center;
wherein the emergency message application is enabled to receive a plurality of emergency messages generated by the emergency message control center, and wherein the emergency message application is configured to provide a user with only certain types of the plurality of emergency messages based on predetermined preferences of the user, including a geographical area relating to the emergency messages desired to be received by the user.

2. The system of claim 1, wherein the emergency message application can provide a plurality of location data regarding a current location of the mobile device to the emergency message system control center.

3. The system of claim 1, wherein the emergency message system control center can track the location of the mobile device.

4. The system of claim 1, wherein the emergency message control center provides only the plurality of emergency messages relevant to a current location of the mobile device.

5. The system of claim 1, wherein the personal emergency message transceiver is enabled to communicate with a wireless router.

6. The system of claim 5, wherein the mobile device communicates with the emergency message system control center via an Internet connection provided by the wireless router.

7. The system of claim 1, wherein the personal emergency message transceiver is enabled to communicate with a cellular base station.

8. The system of claim 5, wherein the mobile device communicates with the emergency message system control center via an Internet connection linked to a cellular communication network of the cellular base station.

9. A wireless communication device comprising:
a transceiver configured to send and receive one or more emergency messages via one or more devices in the network;
an emergency message application operatively connected to a memory;
wherein the transceiver is configured to receive a plurality of emergency messages generated by an emergency message control center; and
wherein the emergency message application is configured to provide the plurality of emergency messages to a user of the wireless communication device, wherein the emergency message application can be configured to provide only certain types of the plurality of emergency messages to the user based on a predetermined preference of the user, the including a geographical area relating to the emergency messages desired to be received by the user.

10. The wireless communication device of claim 9, wherein the transceiver of the wireless communication device is enabled to communicate with a wireless router.

11. The wireless communication device of claim 10, wherein the wireless communication device communicates with the emergency message system control center via an Internet connection provided by the wireless router.

12. The wireless communication device of claim 9, wherein the transceiver of the wireless communication device is enabled to communicate with a cellular base station.

13. The wireless communication device of claim 12, wherein the wireless communication device communicates with the emergency message system control center via an Internet connection linked to a cellular communication network of the cellular base station.

14. A wireless communication device comprising:
a transceiver configured to send and receive one or more emergency messages via one or more devices in a communication network;
an emergency message application operatively connected to a memory;
wherein the transceiver is configured to receive a plurality of emergency messages generated by an emergency message system control center; and
wherein the emergency message application is configured to provide one or more of the plurality of emergency messages to a user of the wireless communication device based on preselected user preferences, including a geographical area relating to the emergency messages desired to be received by the user.

15. The wireless communication device of claim 14, wherein the transceiver of the wireless communication device is enabled to communicate with a wireless router.

16. The wireless communication device of claim 15, wherein the wireless communication device communicates with the emergency message system control center via an Internet connection provided by the wireless router.

17. The wireless communication device of claim 14, wherein the transceiver of the wireless communication device is enabled to communicate with a cellular base station.

18. The wireless communication device of claim 17, wherein the wireless communication device communicates with the emergency message system control center via an Internet connection linked to a cellular communication network of the cellular base station.

\* \* \* \* \*